(12) United States Patent
Zalewski

(10) Patent No.: US 9,497,491 B2
(45) Date of Patent: Nov. 15, 2016

(54) SCHEME FOR DETERMINING THE LOCATIONS AND TIMING OF ADVERTISEMENTS AND OTHER INSERTIONS IN MEDIA

(71) Applicant: Sony Computer Entertainment America LLC, San Mateo, CA (US)

(72) Inventor: Gary M. Zalewski, Piedmont, CA (US)

(73) Assignee: Sony Interactive Entertainment America LLC, San Mateo, CA (US)

( * ) Notice: Subject to any disclaimer, the term of this patent is extended or adjusted under 35 U.S.C. 154(b) by 0 days.

(21) Appl. No.: 14/508,723

(22) Filed: Oct. 7, 2014

(65) Prior Publication Data

US 2015/0025949 A1     Jan. 22, 2015

Related U.S. Application Data

(60) Division of application No. 14/175,996, filed on Feb. 7, 2014, now Pat. No. 8,988,609, which is a
(Continued)

(51) Int. Cl.
*H04N 5/93* (2006.01)
*H04N 21/234* (2011.01)
(Continued)

(52) U.S. Cl.
CPC .... *H04N 21/23424* (2013.01); *G06K 9/00268* (2013.01); *G06K 9/62* (2013.01);
(Continued)

(58) Field of Classification Search
CPC ................ H04N 5/147; H04N 21/4307; H04N 21/4316; H04N 21/44012; H04N
(Continued)

(56) References Cited

U.S. PATENT DOCUMENTS 5,099,322 A    3/1992   Gove
5,953,076 A    9/1999   Astle
(Continued)

FOREIGN PATENT DOCUMENTS

CN    1054694 A    9/1991
CN    1327676 A    12/2001
(Continued)

OTHER PUBLICATIONS

Chinese Patent Office; 'Reexamination Decision' issued in Chinese Patent Application No. 200880009256.1, dated Nov. 25, 2014, 8 pages.
(Continued)

*Primary Examiner* — Amir Mehrmanesh
(74) *Attorney, Agent, or Firm* — Fitch, Even, Tabin & Flannery, LLP

(57) ABSTRACT

A non-transitory computer readable storage medium stores one or more computer programs adapted to cause a processor based system to execute steps that include analyzing an image, identifying one or more faces in the image using a face recognition technique, designating at least one of the identified faces collectively as a first area of interest, and determining whether an insertion area exists in the image where additional content can be inserted without obstructing the first area of interest. Another computer program is adapted to cause a processor based system to execute steps that include determining whether the insertion area can be divided into two or more regions based on color. Methods and processor based apparatuses that perform one or more of these steps are also disclosed.

10 Claims, 21 Drawing Sheets

Related U.S. Application Data continuation-in-part of application No. 13/891,095, filed on May 9, 2013, now Pat. No. 8,665,373, which is a continuation of application No. 11/689,982, filed on Mar. 22, 2007, now Pat. No. 8,451,380.

(51) Int. Cl.

| | |
|---|---|
| G06K 9/62 | (2006.01) |
| G06Q 30/02 | (2012.01) |
| H04N 5/14 | (2006.01) |
| H04N 21/43 | (2011.01) |
| H04N 21/431 | (2011.01) |
| H04N 21/44 | (2011.01) |
| H04N 21/81 | (2011.01) |
| H04N 21/858 | (2011.01) |
| G06K 9/00 | (2006.01) |

(52) U.S. Cl.
CPC .......... *G06Q 30/0241* (2013.01); *H04N 5/147* (2013.01); *H04N 21/23418* (2013.01); *H04N 21/4307* (2013.01); *H04N 21/4316* (2013.01); *H04N 21/44012* (2013.01); *H04N 21/812* (2013.01); *H04N 21/8583* (2013.01); *H04N 21/8586* (2013.01)

(58) Field of Classification Search
CPC .................. 21/812;H04N 21/23424; H04N 21/8586; H04N 21/23418; H04N 21/8583; G06K 9/62; G06K 9/00268; G06Q 30/0241
USPC ............... 725/32–36, 135–136; 348/578, 348/586–588
See application file for complete search history.

(56) References Cited

U.S. PATENT DOCUMENTS

| | | | |
|---|---|---|---|
| 6,297,853 | B1 | 10/2001 | Sharir |
| 6,373,508 | B1 | 4/2002 | Moengen |
| 6,624,853 | B1 | 9/2003 | Latypov |
| 6,954,498 | B1 | 10/2005 | Lipton |
| 7,015,978 | B2 | 3/2006 | Jeffers |
| 7,020,381 | B1 | 3/2006 | Kato |
| 8,151,295 | B1 | 4/2012 | Eldering |
| 8,451,380 | B2 | 5/2013 | Zalewski |
| 8,549,554 | B2 | 10/2013 | Zalewski |
| 8,566,865 | B2 | 10/2013 | Zalewski |
| 8,665,373 | B2 | 3/2014 | Zalewski |
| 8,860,803 | B2 | 10/2014 | Zalewski |
| 8,988,609 | B2 | 3/2015 | Zalewski |
| 9,038,100 | B2 | 5/2015 | Zalewski |
| 9,237,258 | B2 | 1/2016 | Zalewski |
| 2002/0002525 | A1 | 1/2002 | Arai |
| 2002/0027617 | A1 | 3/2002 | Jeffers |
| 2002/0044683 | A1 | 4/2002 | Deshpande |
| 2002/0083439 | A1 | 6/2002 | Eldering |
| 2002/0100042 | A1 | 7/2002 | Khoo |
| 2002/0112249 | A1 | 8/2002 | Hendricks |
| 2003/0028432 | A1 | 2/2003 | Troyansky |
| 2003/0028873 | A1 | 2/2003 | Lemmons |
| 2004/0098753 | A1 | 5/2004 | Reynolds |
| 2004/0193488 | A1 | 9/2004 | Khoo |
| 2004/0194128 | A1 | 9/2004 | McIntyre |
| 2005/0137958 | A1 | 6/2005 | Huber |
| 2006/0155615 | A1 | 7/2006 | Loo |
| 2007/0055986 | A1 | 3/2007 | Gilley |
| 2007/0197287 | A1 | 8/2007 | Shimizu |
| 2007/0214476 | A1 | 9/2007 | Zalewski |
| 2007/0220553 | A1 | 9/2007 | Branam |
| 2007/0226761 | A1 | 9/2007 | Zalewski |
| 2007/0279494 | A1 | 12/2007 | Aman |
| 2008/0126226 | A1 | 5/2008 | Popkiewicz |
| 2008/0231751 | A1 | 9/2008 | Zalewski |
| 2010/0228421 | A1 | 9/2010 | DiBernardo |
| 2011/0145856 | A1 | 6/2011 | Agarwal |
| 2011/0321084 | A1 | 12/2011 | Takahashi |
| 2012/0005595 | A1 | 1/2012 | Gavade |
| 2013/0091519 | A1 | 4/2013 | Mclauchlan |
| 2013/0242195 | A1 | 9/2013 | Zalewski |
| 2014/0040944 | A1 | 2/2014 | Zalewski |
| 2014/0043364 | A1 | 2/2014 | Zalewski |
| 2014/0130084 | A1 | 5/2014 | Zalewski |
| 2014/0156364 | A1 | 6/2014 | Zalewski |
| 2015/0128171 | A1 | 5/2015 | Zalewski |
| 2015/0304710 | A1 | 10/2015 | Zalewski |

FOREIGN PATENT DOCUMENTS

| | | |
|---|---|---|
| CN | 1423896 A | 6/2003 |
| CN | 101196997 | 6/2008 |
| CN | 101641873 | 2/2010 |
| EP | 1158788 A1 | 11/2001 |
| EP | 1168210 A1 | 1/2002 |
| EP | 1416727 A1 | 5/2004 |
| EP | 1463317 A2 | 9/2004 |
| JP | 2004304792 A | 10/2004 |
| JP | 2007530978 A | 11/2007 |
| WO | 9703517 A1 | 1/1997 |
| WO | 0249351 A2 | 6/2002 |
| WO | 2005076598 A1 | 8/2005 |

OTHER PUBLICATIONS

European Patent Office; "Decision to refuse a European Patent application" issued in European Patent Application No. 07757929. 0, dated Oct. 16, 2014, 21 pages.

Chinese Patent Office, 'Third Office Action' issued in Chinese Patent Application No. 200780016668.3 dated Jan. 31, 2012, 31 pages.

Chinese Patent Office; 'Decision of Rejection' issued in Chinese Patent Application No. 200780016668.3, dated Sep. 5, 2012, 38 pages (includes English translation).

Chinese Patent Office; 'Decision on Rejection' issued in Chinese Patent Application No. 200880009256.1, dated Dec. 5, 2012 (includes English translation), 15 pages.

Chinese Patent Office; 'First Office Action' issued in Chinese Application No. 2007.80016668.3; issued Feb. 12, 2010, 31 pages.

Chinese Patent Office; 'First Office Action' issued in Chinese Patent Application No. 200880009256.1 dated Jun. 5, 2012 (includes English translation), 13 pages.

Chinese Patent Office; 'Fourth Office Action' issued in Chinese Patent Application No. 200780016668.3, dated May 15, 2012, 35 pages (includes English translation).

Chinese Patent Office; 'Second Office Action' issued in Chinese Application No. 2007.80016668.3; dated Mar. 2, 2011, 21 pages.

European Patent Office, Communication pursuant to Article 94(3) EPC' issued in European Patent Application No. 08018364.3 dated Jan. 2, 2012, 7 pages.

European Patent Office, Communication pursuant to Article 94(3) EPC issued in European Application No. 07757929 dated Dec. 5, 2011 (6 pages).

European Patent Office; 'Communication Pursuant to Article 94(3) EPC' issued in European Application No. EP 07 757 929.0 for PCT/US2007/063326; dated Aug. 11, 2010; 1 page.

European Patent Office; 'Communication under Rule 71(3) EPC' issued in European Patent Application No. 08018364.3 dated Jun. 25, 2012, 50 pages.

European Patent Office; 'Decision to grant a European Patent pursuant to Article 97 (1) EPC' issued in European Patent Application No. 08018364.3, mailed Nov. 2, 2012, 2 pages.

European Patent Office; 'European Search Report' issued in European Publication No. EP 2046043A3 for EP Application No. 08018364.3; dated Mar. 30, 2010; 3 pages.

European Patent Office; 'Extended European Search Report' issued in European Patent Application No. 12179714.6, mailed Sep. 28, 2012, 8 pages.

(56) References Cited

OTHER PUBLICATIONS

European Patent Office; 'Extended European Search Report (including the Supplementary European Search Report and the European Search Opinion)' issued in European Application No. EP 07 757 929.0 for PCT/US2007/063326; dated Apr. 9, 2010; 7 pages.
European Patent Office; 'Extended European Search Report (including the Supplementary European Search Report and the European Search Opinion)' issued in European Application No. EP 08 01 8364.3; dated Apr. 9, 2010; 8 pages.
European Patent Office; "Communication pursuant to Article 94(3) EPC" issued in European Patent Application No. 12179714.6, dated Jan. 7, 2014, 4 pages.
European Patent Office; "Summons to Attend Oral Proceedings Pursuant to Rule 115(1) EPC" issued in European Patent Application No. 07757929.0, dated Feb. 20, 2014, 8 pages.
Japanese Patent Office; 'Decision of Refusal' issued in Japanese Patent Application No. 2008-558491, dated Sep. 25, 2012, 4 pages (includes English translation).
Japanese Patent Office; 'Notification of Reason(s) for Refusal' issued in Japanese Application No. 2008-558491; dated Nov. 15, 2011; 6 pages (including English translation).
Japanese Patent Office; 'Notification of Reasons for Refusal' issued in Japanese Patent Application No. 2012-055357, dated Apr. 16, 2013, 5 pages (includes English translation).
Japanese Patent Office; "Final Notification of Reasons for Refusal" issued in Japanese Patent Application No. 2012-055357, dated Aug. 6, 2013, 4 pages (includes English translation).
Japanese Patent Office; "Final Notification of Reasons for Refusal" issued in Japanese Patent Application No. 2012-055358, dated Aug. 6, 2013, 4 pages (includes English translation).
Japanese Patent Office; "Notification of Reasons for Refusal" issued in Japanese Patent Application No. 2012-055358, dated Apr. 16, 2013, 4 pages (includes English translation).
Japanese Patent Office; Notification of Reasons for Refusal issued in Japanese Patent Application No. 2008-558491; dated May 15, 2012; 4 pages (includes English translation).
Patent Cooperation Treaty; 'International Preliminary Report on Patentability' issued in PCT/ US07/63326; dated Oct. 21, 2008; 8 pages.
Patent Cooperation Treaty; 'International Search Report' issued in PCT/US07/63326; mailed Sep. 3, 2008; 2 pages.
Patent Cooperation Treaty; 'International Search Report' issued in PCT Application No. PCT/US2008/057373, dated May 26, 2008; 2 pages.
Patent Cooperation Treaty; 'Notification of Transmittal of the International Search Report and the Written Opinion of the International Searching Authority or Declaration' issued in PCT/US07/63326; mailed Sep. 3, 2008; 2 pages.
Patent Cooperation Treaty; 'Notification of Transmittal of the International Search Report and the Written Opinion of the International Searching Authority or the Declaration' issued in PCT Application No. PCT/US2008/057373, dated Jul. 1, 2008; 2 pages.
Patent Cooperation Treaty; 'Written Opinion of the International Searching Authority' issued in PCT/US07/63326; mailed Sep. 3, 2008; 7 pages.
Patent Cooperation Treaty; 'Written Opinion of the International Searching Authority' issued in PCT Application No. PCT/US2008/057373, dated May 26, 2008; 7 pages.
Patent Cooperation Treaty; "International Preliminary Report on Patentability" issued in PCT/US2008/057373; dated Sep. 22, 2009; 6 pages.
USPTO, Final Office Action issued in U.S. Appl. No. 11/689,982, mailed Dec. 9, 2011, 11 pages.
USPTO, Office Action issued in U.S. Appl. No. 11/371,367 mailed Mar. 22, 2012, 15 pages.
USPTO; 'Non-final Office Action, Supplemental' issued in U.S. Appl. No. 11/371,367, mailed Jul. 29, 2008; 13 pages.
USPTO; Advisory Action issued in U.S. Appl. No. 11/371,215, mailed Jun. 19, 2009; 3 pages.
USPTO; Advisory Action issued in U.S. Appl. No. 11/689,982, mailed Feb. 27, 2012, 3 pages.
USPTO; Applicant-Initiated Interview Summary issued in U.S. Appl. No. 11/689,982, mailed Dec. 14, 2012, 5 pages.
USPTO; Final Office Action issued in U.S. Appl. No. 11/371,215, mailed Apr. 5, 2012,13 pages.
USPTO; Final Office Action issued in U.S. Appl. No. 11/371,215, mailed Mar. 4, 2009; 11 pages.
USPTO; Final Office Action issued in U.S. Appl. No. 11/371,367, mailed Oct. 11, 2012, 6 pages.
USPTO; Final Office Action issued in U.S. Appl. No. 11/371,367; dated Mar. 16, 2010, 12 pages.
USPTO; Final Office Action issued in U.S. Appl. No. 11/371,367; mailed Feb. 2, 2009; 16 pages.
USPTO; Final Office Action issued in U.S. Appl. No. 11/689,982, mailed Oct. 16, 2012, 15 pages.
USPTO; Interview Summary issued in U.S. Appl. No. 11/371,367; mailed Oct. 27, 2008; 2 pages.
USPTO; Notice of Allowance & Examiner-Initiated Interview Summary issued in U.S. Appl. No. 13/891,095, mailed Oct. 7, 2013, 21 pages.
USPTO; Notice of Allowance & Examiner-Initiated Interview Summary issued in U.S. Appl. No. 14/026,948, mailed Jun. 11, 2014, 8 pages.
USPTO; Notice of Allowance & Examiner-Initiated Interview Summary issued in U.S. Appl. No. 14/175,996, mailed Oct. 16, 2014, 18 pages.
USPTO; Notice of Allowance issued in U.S. Appl. No. 11/371,215, mailed Jun. 13, 2013, 8 pages.
USPTO; Notice of Allowance issued in U.S. Appl. No. 11/371,367, mailed Jan. 15, 2013, 5 pages.
USPTO; Notice of Allowance issued in U.S. Appl. No. 11/371,367, mailed May 28, 2013, 6 pages.
USPTO; Notice of Allowance issued in U.S. Appl. No. 11/689,982, mailed Jan. 31, 2013,14 pages.
USPTO; Office Action issued in U.S. Appl. No. 11/371,367; mailed Jul. 27, 2009; 9 pages.
USPTO; Office Action issued in U.S. Appl. No. 11/371,215, mailed Sep. 10, 2008; 11 pages.
USPTO; Office Action issued in U.S. Appl. No. 11/371,215, mailed Sep. 10, 2009; 10 pages.
USPTO; Office Action issued in U.S. Appl. No. 11/371,215; mailed Jul. 22, 2011, 12 pages.
USPTO; Office Action issued in U.S. Appl. No. 11/371,215; mailed Mar. 29, 2010, 10 pages.
USPTO; Office Action issued in U.S. Appl. No. 11/689,982, mailed Apr. 5, 2012, 15 pages.
USPTO; Office Action issued in U.S. Appl. No. 11/689,982; mailed Jun. 20, 2011, 14 pages.
USPTO; Office Action issued in U.S. Appl. No. 14/026,948, mailed Dec. 11, 2013, 9 pages.
USPTO; Office Action issued in U.S. Appl. No. 14/030,958, mailed Sep. 17, 2014, 7 pages.
USPTO; Office Action issued in U.S. Appl. No. 14/151,536, mailed Jul. 17, 2014, 12 pages.
USPTO; Office Action issued in U.S. Appl. No. 11/371,367; dated Jul. 20, 2011; 12 pages.
USPTO; Office Action issued in U.S. Appl. No. 11/371,367 dated Jul. 16, 2008; 13 pages.
USPTO; Restriction Requirement issued in U.S. Appl. No. 14/151,536, mailed May 5, 2014, 6 pages.
USPTO; Restriction Requirement issued in U.S. Appl. No. 14/175,996, mailed Jul. 7, 2014, 6 pages.
Wang, Yang et al. 'Estimation of multiple directional light sources for synthesis of augmented reality images.' CS Dep't, SUNY Stony Brook, 2003. http://www.cs.sunysb.edU/vislab/wordpress//papers/GM2003.pdf.
Chinese Patent Office; 'First Office Action' issued in Chinese Patent Application No. 201210557696.9, dated Dec. 24, 2014, 8 pages.
European Patent Office; "Communication under Rule 71(3) EPC" issued in European Patent Application No. 12179714.6, dated Mar. 11, 2015, 39 pages.

(56) References Cited

OTHER PUBLICATIONS

USPTO; Corrected Notice of Allowability issued in U.S. Appl. No. 14/175,996, mailed Feb. 24, 2015, 5 pages.
USPTO; Notice of Allowance & Examiner-Initiated Interview Summary issued in U.S. Appl. No. 14/151,536, mailed Feb. 12, 2015, 14 pages.
USPTO; Notice of Allowance issued in U.S. Appl. No. 14/030,958, mailed Jan. 8, 2015, 6 pages.
USPTO; U.S. Appl. No. 14/596,057, filed Jan. 13, 2015, Unpublished.
Patent Cooperation Treaty; 'International Search Report' issued in PCT Application No. PCT/US2015/011405, dated Apr. 20, 2015; 2 pages.
Patent Cooperation Treaty; 'Notification of Transmittal of the International Search Report and the Written Opinion of the International Searching Authority, or the Declaration' issued in PCT Application No. PCT/US2015/011405, dated Apr. 20, 2015; 2 pages.
Patent Cooperation Treaty; 'Written Opinion' issued in PCT Application No. PCT/ US2015/011405, dated Apr. 20, 2015; 10 pages.
Chinese Patent Office; 'Second Office Action' issued in Chinese Patent Application No. 200880009256.1, dated May 5, 2015 (includes English translation), 16 pages.
USPTO; U.S. Appl. No. 14/752,657, filed Jun. 26, 2015, Unpublished.
Chinese Patent Office; 'Second Office Action' issued in Chinese Patent Application No. 201210557696.9, dated Aug. 28, 2015 (includes English translation), 8 pages.
USPTO; Notice of Allowance & Examiner-Initiated Interview Summary issued in U.S. Appl. No. 14/151,536, mailed Sep. 15, 2015, 10 pages.
USPTO; Notice of Allowance issued in U.S. Appl. No. 14/151,536, mailed May 29, 2015, 8 pages.
USPTO; Office Action issued in U.S. Appl. No. 14/596,057, mailed Aug. 11, 2015, 13 pages.
USPTO; Office Action issued in U.S. Appl. No. 14/752,657, mailed Sep. 23, 2015, 13 pages.
Chinese Patent Office; 'Third Office Action' issued in Chinese Patent Application No. 200880009256.1, dated Nov. 24, 2015 (includes English translation), 19 pages.
USPTO; Corrected Notice of Allowability issued in U.S. Appl. No. 14/151,536, mailed Dec. 14, 2015, 5 pages.
USPTO; Final Office Action issued in U.S. Appl. No. 14/596,057, mailed Feb. 24, 2016, 15 pages.
Australian Government Patent Office, IP Australia; "Patent Examination Report No. 1"; issued in corresponding Australian Patent Application No. 2015200290; Date of issue Mar. 1, 2016; 2 pages.
Canadian Intellectual Property Office; "Official Action" issued in Canadian Patent Application No. 2,879,235, dated Mar. 16, 2016, 3 pages.
Chinese Patent Office; "First Office Action" issued in Chinese Patent Application No. 201510054926.3, mailed Mar. 3, 2016, 9 pages (includes English translation).
Chinese Patent Office; "Fourth Office Action" issued in Chinese Patent Application No. 200880009256.1, dated May 5, 2016 (includes English translation), 14 pages.
Chinese Patent Office; "Notification to Grant Patent Right for Invention", issued in Chinese Patent Application No. 201210557696.9, issued Mar. 15, 2016, 6 pages (includes English translation).
USPTO; Final Office Action issued in U.S. Appl. No. 14/752,657, mailed May 19, 2016, 15 pages.
USPTO; Office Action issued in U.S. Appl. No. 14/596,057, mailed Jun. 2, 2016, 15 pages.
USPTO; Notice of Allowance & Examiner-Initiated Interview Summary filed in U.S. Appl. No. 14/752,657, mailed Aug. 24, 2016, 10 pages.

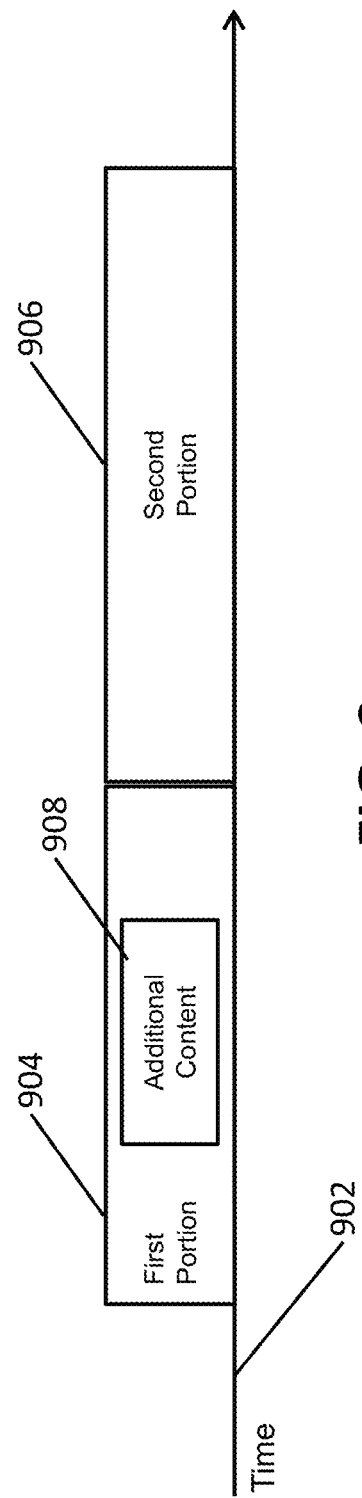

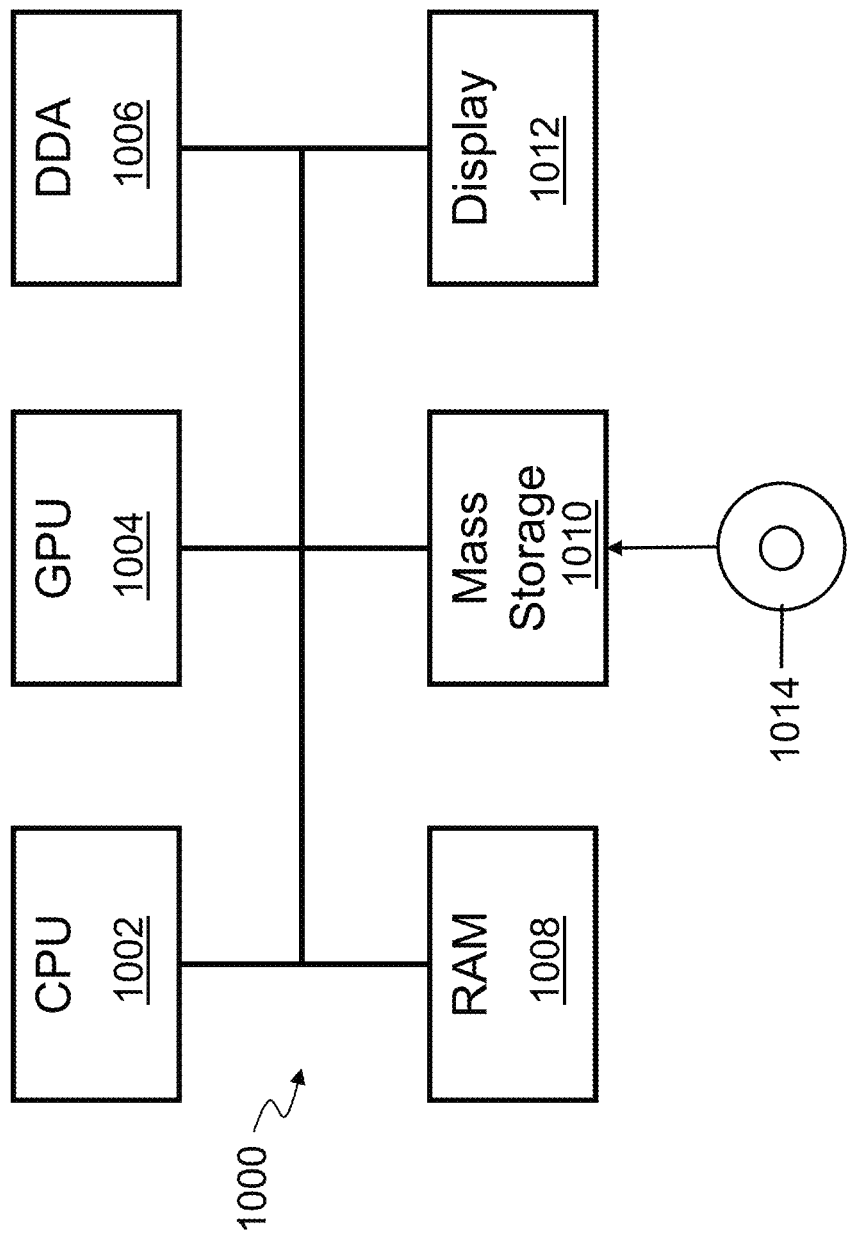

SCHEME FOR DETERMINING THE LOCATIONS AND TIMING OF ADVERTISEMENTS AND OTHER INSERTIONS IN MEDIA

CROSS-REFERENCE TO RELATED APPLICATIONS

This application is a divisional of U.S. patent application Ser. No. 14/175,996, filed on Feb. 7, 2014, entitled "SCHEME FOR DETERMINING THE LOCATIONS AND TIMING OF ADVERTISEMENTS AND OTHER INSERTIONS IN MEDIA", which is a continuation-in-part (CIP) of U.S. patent application Ser. No. 13/891,095, filed on May 9, 2013, now U.S. Pat. No. 8,665,373, entitled "SCHEME FOR DETERMINING THE LOCATIONS AND TIMING OF ADVERTISEMENTS AND OTHER INSERTIONS IN MEDIA," which is a continuation of U.S. patent application Ser. No. 11/689,982, filed on Mar. 22, 2007, now U.S. Pat. No. 8,451,380, entitled "SCHEME FOR DETERMINING THE LOCATIONS AND TIMING OF ADVERTISEMENTS AND OTHER INSERTIONS IN MEDIA," the entire disclosures of which are all hereby fully incorporated by reference herein in their entireties.

BACKGROUND OF THE INVENTION

1. Field of the Invention

The present invention relates generally to digital video processing, and more specifically to digital insertion of images and video in program content.

2. Discussion of the Related Art

One traditional form of advertising is the television commercial. Such television commercials typically consist of brief advertising spots that range in length from a few seconds to several minutes. The commercials appear between shows and interrupt the shows at regular intervals. The goal of advertisers is to keep the viewer's attention focused on the commercial, but often times the viewer will change the channel during the commercial to avoid watching the commercial.

Another way that viewers have avoided television commercials is by using digital video recorders (DVRs). With a DVR a person can record a show and then fast forward through the commercials during playback. Other media players are expected to provide viewers with even greater ability to track and skip commercials.

It is with respect to these and other background information factors, including the growth and popularity of user-created video services such as YouTube®, and the need to insert advertising in such media, that the present invention has evolved.

SUMMARY OF THE INVENTION

One embodiment provides a non-transitory computer readable storage medium storing one or more computer programs adapted to cause a processor based system to execute steps comprising: analyzing an image; identifying one or more faces in the image using a face recognition technique; designating at least one of the identified faces collectively as a first area of interest; and determining whether an insertion area exists in the image where additional content can be inserted without obstructing the first area of interest.

Another embodiment provides a non-transitory computer readable storage medium storing one or more computer programs adapted to cause a processor based system to execute steps comprising: analyzing a sequence of frames of content; identifying a first area of interest in a scene depicted by the sequence of frames that should not be obstructed from being viewed; determining whether an insertion area exists in the scene where additional content can be inserted without obstructing the first area of interest; and determining whether the insertion area can be divided into two or more regions based on color.

Another embodiment provides a method, comprising: analyzing a first sequence of frames of content; identifying one or more faces in a scene depicted by the first sequence of frames using a face recognition technique; designating at least one of the identified faces collectively as a first area of interest; and determining whether an insertion area exists in the scene where additional content can be inserted without obstructing the first area of interest.

Another embodiment provides a method, comprising: analyzing a sequence of frames of content; identifying a first area of interest in a scene depicted by the sequence of frames that should not be obstructed from being viewed; determining whether an insertion area exists in the scene where additional content can be inserted without obstructing the first area of interest; and determining whether the insertion area can be divided into two or more regions based on color.

Another embodiment provides a non-transitory computer readable storage medium storing one or more computer programs adapted to cause a processor based system to execute steps comprising: playing a first sequence of frames, wherein the first sequence of frames includes an advertisement inserted into a scene depicted by at least some of the frames in the first sequence of frames; and playing a second sequence of frames after the first sequence of frames; wherein the advertisement was inserted into the scene in the first sequence of frames by a process that includes, identifying one or more faces in the scene using a face recognition technique; designating at least one of the identified faces collectively as a first area of interest; and inserting the advertisement into an insertion area in the scene that does not obstruct the first area of interest.

Another embodiment provides a method for use with content, comprising: analyzing a sequence of frames of the content; determining whether an area exists in a scene depicted by the sequence of frames where additional content can be inserted without obstructing activity in the scene; for any such area, determining an amount of time that the area is available when the sequence of frames is being played; and for any such area, determining a size of the area.

Another embodiment provides a storage medium storing a computer program executable by a processor based system, the computer program causing the processor based system to execute steps comprising: analyzing a sequence of frames of content; determining whether an area exists in a scene depicted by the sequence of frames where additional content can be inserted without obstructing activity in the scene; for any such area, determining an amount of time that the area is available when the sequence of frames is being played; and for any such area, determining a size of the area.

Another embodiment provides an apparatus for use with content, comprising: a processor based system that is configured to analyze a sequence of frames of the content and determine whether an area exists in a scene depicted by the sequence of frames where additional content can be inserted without obstructing activity in the scene; wherein for any such area, the processor based system is further configured to determine an amount of time that the area is available when the sequence of frames is being played and determine a size of the area.

A better understanding of the features and advantages of various embodiments of the present invention will be obtained by reference to the following detailed description and accompanying drawings which set forth an illustrative embodiment in which principles of embodiments of the invention are utilized.

BRIEF DESCRIPTION OF THE DRAWINGS

The above and other aspects, features and advantages of embodiments of the present invention will be more apparent from the following more particular description thereof, presented in conjunction with the following drawings wherein:

FIG. 9 is a timing diagram illustrating a method for use with content in accordance with another embodiment of the present invention; and FIG. 10 is a block diagram illustrating a processor based system that may be used to run, implement and/or execute the methods and/or techniques shown and described herein in accordance with embodiments of the present invention.

DETAILED DESCRIPTION

When viewers avoid traditional television commercials as described above, the advertisers' messages are not received by the viewers, which is disadvantageous. Because of such disadvantages, embodiments of the present invention relate to the insertion of advertisements or other content into the television show or other program itself.

Some of the embodiments of the present invention involve an automated method for determining the timing and position of advertisements or other insertions to be placed in content. Such content may include any type of content, such as for example television shows, movies, videos, web pages, games, etc. In some embodiments, the method may operate by analyzing a sequence of video frames over time to determine clean, uncluttered, or other areas or regions in the media where the activity in the scene is not obstructed by a zone occupied by an advertisement overlay.

Figure 1:
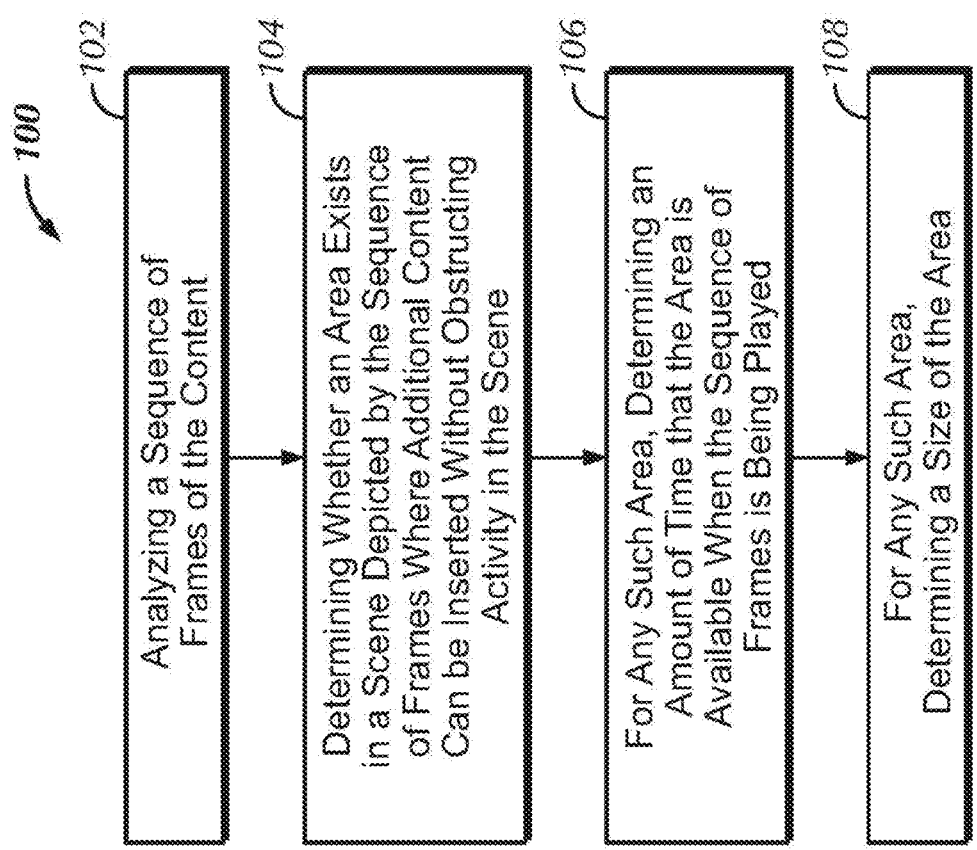
FIG. 1 is a flow diagram illustrating a method for use with content in accordance with an embodiment of the present invention.

For example, referring to FIG. 1 there is illustrated a method 100 that operates in accordance with an embodiment of the present invention. The method 100, which may be used with any type of content, begins in step 102 in which a sequence of frames of the content is analyzed. By way of example, video analysis of the sequence of video frames may be used to determine appropriate locations to deposit advertisements or other graphics into the media. In some embodiments, such analysis may be automatically conducted on a frame-by-frame basis.

In step 104, it is determined whether an area exists in a scene depicted by the sequence of frames where additional content can be inserted without obstructing activity in the scene. In some embodiments this may be done by going through the video frame-by-frame to identify where movement is happening or regions of voids. For example, there may be people and action happening on one side of the screen, but no movement on the other side of screen. The area of no movement may be an appropriate place to insert an advertisement or other additional content.

In step 106, for any area identified as appropriate for receiving additional content, the amount of time that the area is available when the sequence of frames is being played is determined. And in step 108, the size of any identified area is determined. As such, a system implementing this method may determine whether or not the region of no activity is large enough to fit an advertisement.

The method 100 may be performed automatically by any type of computer or processor based system. Such a system may conduct a frame-by-frame analysis over time to track the action in the scenes and mark the blocks of video that are appropriate for the insertion of advertisements or other images or content. In some embodiments, the frame-by-frame analysis may be conducted by image analysis software.

Thus, in some embodiments a system looks at the frames in the video and identifies the locations in the video where there is activity and where there is no activity. In a simple scenario the camera is fixed and the actors are moving. That is, the sequence of frames comprises a representation of video shot by a fixed camera. In a more complex scenario, the camera is moving or panning across the scene, which includes fixed objects, as well as moving objects. That is, the sequence of frames comprises a representation of video shot by a moving camera.

Figure 2A:
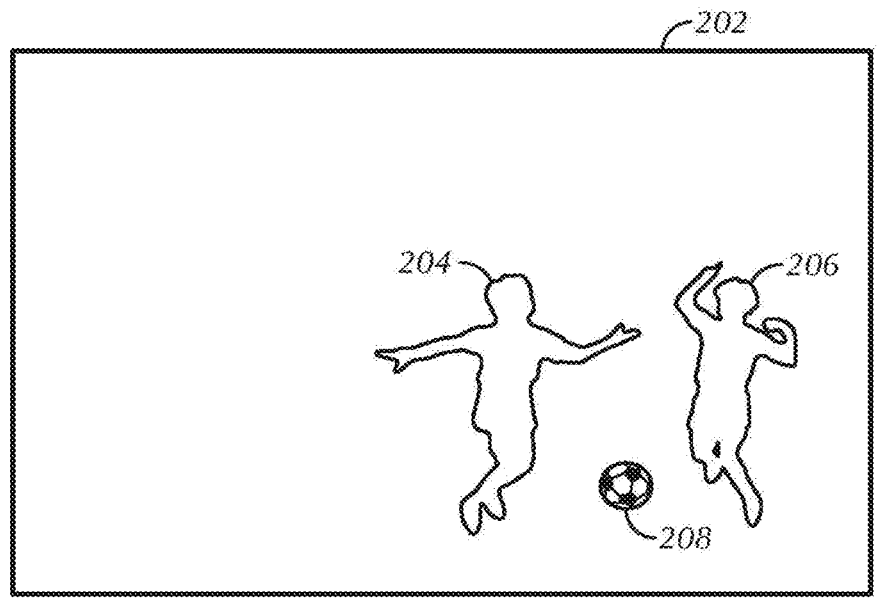
FIGS. 2A and 2B are screen shots illustrating an example application of the method of FIG. 1 in accordance with an embodiment of the present invention.

FIG. 2A illustrates an example of the fixed camera scenario. In this example the frame boarder 202 represents each frame in the sequence of frames because the camera is fixed. If two children 204, 206 are playing with a soccer ball 208 on the right side of the screen, an advertisement may be placed on the other side of the screen so as not to obstruct the view of the children playing with the soccer ball. This way, an advertisement may be deposited in the scene so as not to obstruct a view of the moving objects or activity, i.e. the children 204, 206 playing with the ball 208.

Figure 2B:
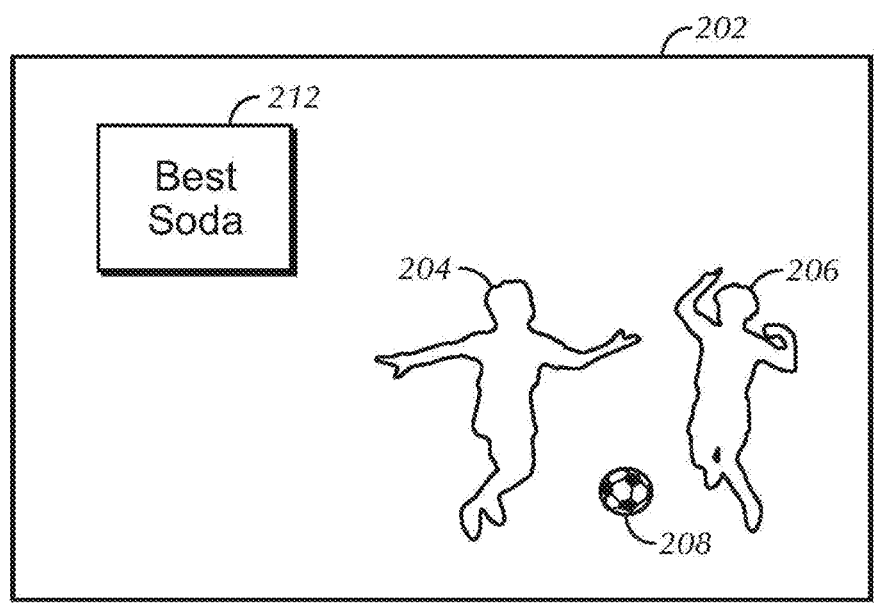

FIG. 2B illustrates an advertisement 212 for "Best Soda" that has been inserted into the scene. Because the two children 204, 206 are playing with the soccer ball 208 are still visible, the activity in connection with the focus of the video has not be obstructed by the advertisement 212. That is, the primary or target or moving objects in the scene are not obstructed by the advertisement 212.

In some embodiments, in analyzing the frames the system may mark a frame or part of a frame as not able to receive an advertisement because there is too much movement. Such frames or portions of frames may be referred to herein as too "dirty." Thus, in the present example the system may block out the portions of the frames associated with the children 204, 206 playing with the soccer ball 208 so that those spaces are not used for the placement of advertisements or other insertions.

As another example, all of the actors and movement in a certain scene may be located on the left side of the screen. As such, the system may block out the portions of the frames corresponding to the actors on the left side of the screen and may indicate that advertisements cannot be placed there. That is, advertisements cannot be placed on the left side of the screen because there are people moving and things are happening on the left side of the screen. Meanwhile, however, the right side of the screen may be clean, and it may have been clean for a certain period of time that may be sufficient for the placing of an advertisement.

In some embodiments, scenes may contain metadata that characterize information about the frames and including the history and momentum of objects moving in the frames, and some embodiments of the present invention may utilize such metadata to determine the potential regions in which content, including advertisements, may be placed in the scene.

In some embodiments, the step of determining if a frame is "dirty" or if a frame region is "dirty" may be performed by analyzing the frame data across one or more frames. Fixed or variable thresholds may be used in the determination of objects of interest and regions of interest. In some embodiments the system may also encode or create metadata as mentioned above for enabling playback system insertion of content.

Figure 3A:
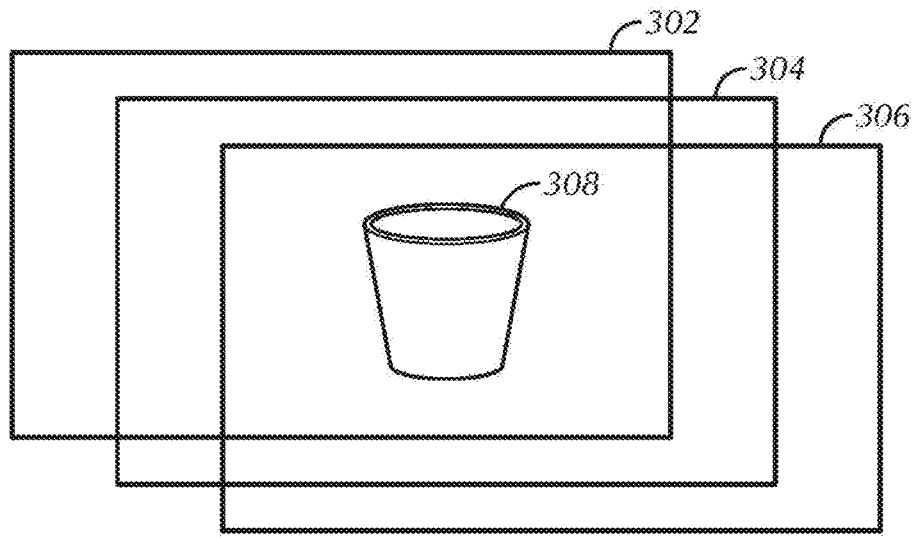
FIGS. 3A and 3B are screen shots illustrating another example application of the method of FIG. 1 in accordance with an embodiment of the present invention.

FIG. 3A illustrates an example of the moving camera scenario. In this example the frame boarders 302, 304, 306 represent three of the frames in the sequence of frames as the camera moves. Because the camera is moving or panning across the scene, a fixed object such as a trash can 308 will appear to be slowly sliding over the background of the scene. The trash can 308 has this appearance because it is positioned toward the right side of frame 302, near the center of frame 304, and then towards the left side of frame 306. With the camera slowly panning across the set, and the objects in the scene are fixed on the set, each frame looks dirty because there is constant movement.

However, by reviewing the frames of the video, the system may determine that the camera is moving, the people within the scene are moving, but that the trash can 308 is fixed. As such, a space on the trash can 308 may be free to use for an advertisement or other image or graphics because the trash can itself is largely fixed.

Figure 3B:
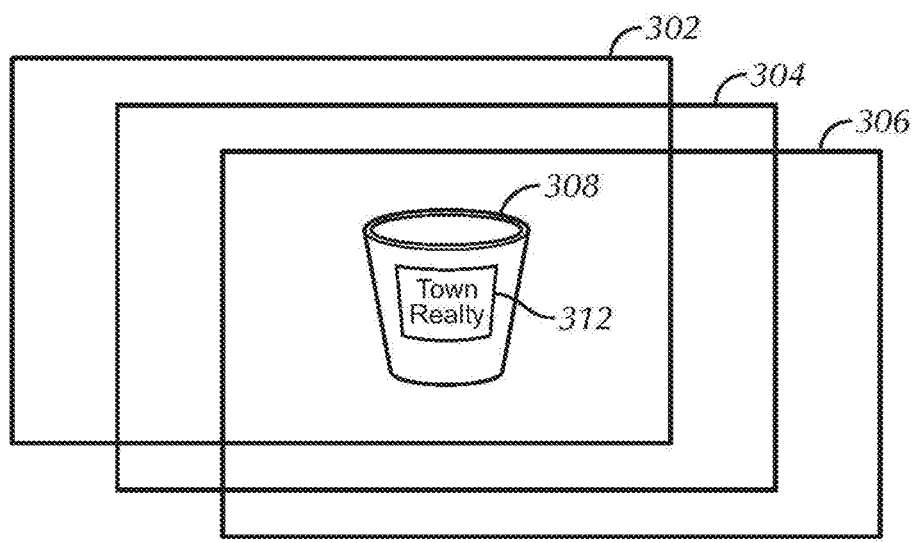

FIG. 3B illustrates an advertisement 312 for "Town Realty" that has been inserted into the scene on the trash can 308. In this example, the trash can 308 comprises an area in the scene where additional content can be inserted without obstructing activity in the scene. Thus, in some embodiments in the scenario where the camera is moving or panning, the system may identify the fixed objects, and then identify how an advertisement may be overlaid onto the fixed objects. In some embodiments, this may be done by moving a fulcrum along the frame to filter out the fixed objects from the moving objects. Namely, the system may slide the point of perspective as to where the reference elements are located within a frame so that the camera movements can be filtered out from the actual actors moving in the scene.

As mentioned above, the method 100 (FIG. 1) includes step 106 for determining the amount of time that the area is available when the sequence of frames is being played, and step 108 for determining the size of the area. For example, a system may determine that the right side of the screen may be free for a certain amount of time, and it may be free to a certain dimension for that amount time. This information may be important for choosing an advertisement because that dimension may be capable of taking an advertisement with a certain maximum size. And furthermore, that dimension may only be available for a certain amount of time, such as for example 2, 5, 15, 20, etc. seconds.

In some embodiments, the system may search the frames in the sequence of frames for a large enough region or space to hold an advertisement of a certain size. The system may also search for a long enough length of time in the video to place a certain advertisement. For example, a certain advertisement may need 15 seconds of free and clear region for placement of the advertisement. The system may do this by determining how long each empty region in the video will last.

In some embodiments, the system may use the determined time and size information to look across a database of advertisements and select an advertisement that is appropriate for the available dimensions and available amount of time. Thus, in some embodiments there is a profiling of video sequences, and then there is a database look-up for an advertisement based on how much time and space is available for the advertisement. For example, in some embodiments a system may determine how much time is available in the video for an occlusion free zone. Then, the database look-up determines whether or not the size of occlusion free zone and the time available meet the requirements for any advertisements that are in the database.

Other factors may or may not be used in choosing the specific advertisement. For example, in some embodiments, the system may simply choose the next advertisement that meets the maximum time available and maximum size available.

Or, in some embodiments the system may choose an advertisement that maximizes the revenue that can be generated from selling the advertisement space. Various different sizes and types of advertisements may maximize the dollar return for the available advertisement space. For example, maximum revenue may be generated by filling the space with several smaller advertisements, or filling the space with one large advertisement. In some embodiments, the system may analyze the space and time available to maximize the dollar revenue based upon those specifications.

In some embodiments, the system may use methods for ordering the selection of the advertisements to meet economic business models. For example, the system may use a priority scheme for selecting the advertisements. As another example, several small advertisements may be used to optimize the available space, which may generate more revenue than one large advertisement. With any such scenario the system may still determine whether or not the next chosen advertisement meets the determined time and size specifications.

Therefore, embodiments of the present invention provide methods for determining the location and timing of advertisements and other content placed in media. Embodiments of the present invention may be used to automatically find blank spaces or voids in video into which advertisements or other content may be inserted. That is, a video may be run through a process according to an embodiment of the present intention to automatically find the blank spaces or voids in the video into which advertisements may be inserted. For example, a ten second clip of video may include two seconds of blank or black screen. In this example, the whole screen may be available for an advertisement for two seconds. Thus, twenty-percent of the ten second video may be populated with advertisements or other content.

It should be well understood that other types of content and not just advertisements may be inserted into the blank spaces or voids. For example, other type of graphics, images, pictures, etc. may comprise the additional content that may be inserted into the areas where additional content can be inserted without obstructing activity in the scene.

Therefore, in some embodiments, a method for use with content includes analyzing a sequence of frames of the content, determining whether an area exists in a scene depicted by the sequence of frames where additional content such as advertising can be inserted without obstructing activity in the scene, for any such area, determining an amount of time that the area is available when the sequence of frames is being played, and for any such area, determining a size of the area. In some embodiments, a storage medium storing a computer program for causing a processor based system to execute these steps, and an apparatus for use with content, are also disclosed.

Figure 4:
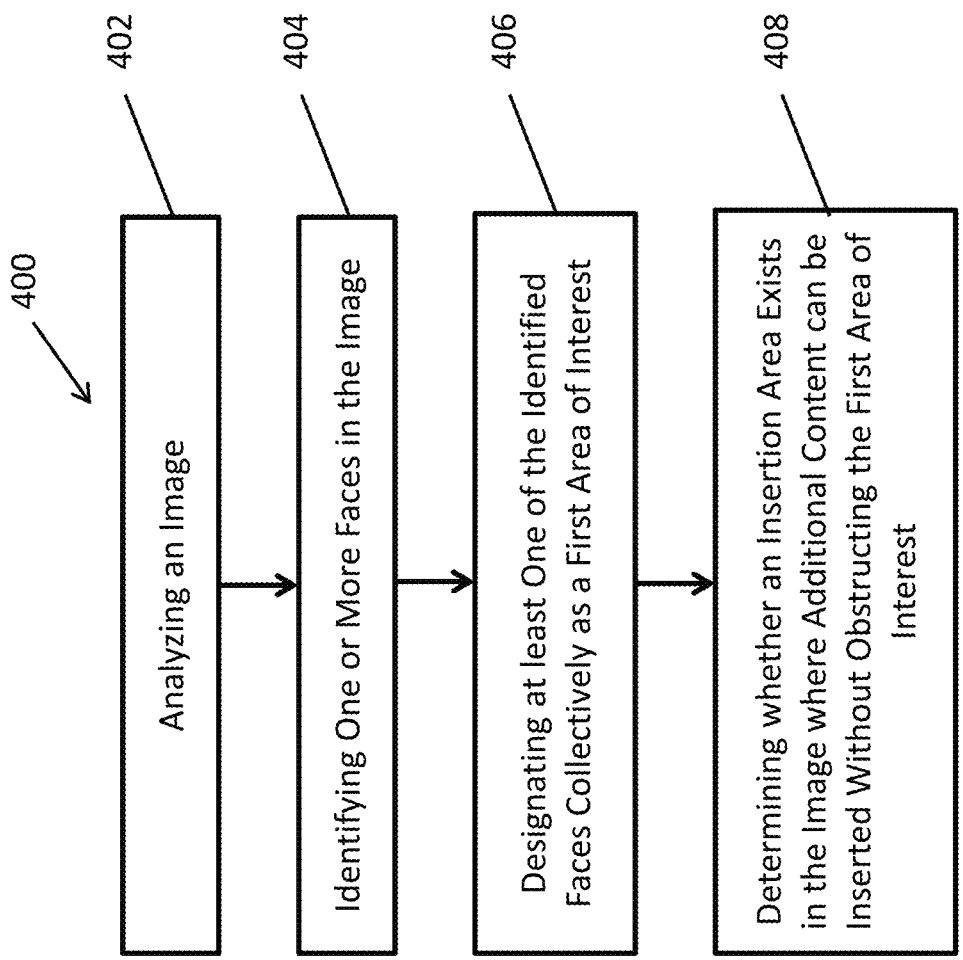
FIG. 4 is a flow diagram illustrating a method for use with content in accordance with another embodiment of the present invention.

Referring to FIG. 4, there is illustrated an example of a method 400 that operates in accordance with another embodiment of the present invention. In some embodiments, the method 400 may be used for determining the location and timing of additional content, such as advertisements, that is to be inserted into media. In some embodiments, the method 400 uses face recognition techniques in order to assist in determining the location of an insertion area for the additional content.

The method 400 begins in step 402 in which an image is analyzed. The image may be a still photograph or picture, or be one frame in a sequence of frames, such as one frame of video type content.

In step 404 one or more faces are identified in the image using a face recognition technique or face recognition technology. Any one or more known face recognition techniques may be used. In some embodiments, the faces that are identified may comprise human faces. In some embodiments, the faces that are identified may comprise animal and/or human faces.

In step 406 at least one of the identified faces is designated as a first area of interest. In some embodiments, the designation as a first area of interest means that this is an area that a viewer would likely be interested in seeing, and so the area should not be obstructed by the additional content that will be inserted. In some embodiments, if more than one of the identified faces is designated as the first area of interest, then the identified faces collectively comprise the first area of interest. That is, an area that encompasses all of the identified faces is designated as the first area of interest.

In some embodiments, the designation of one or more faces as a first area of interest is similar to the above discussion of identifying areas in a scene having activity. That is, an area in a scene having activity is an area that a viewer would likely be interested in seeing, and so the area should preferably not be obstructed by the additional content that will be inserted. Similarly, an area in a scene or image having one or more faces is also an area that a viewer would likely be interested in seeing, and so the area should preferably not be obstructed by the additional content that will be inserted. Thus, in some embodiments, the identified faces may be thought of as a type of activity.

Furthermore, as will be discussed below, in some embodiments an adjustable threshold may be associated with the size, focus, prominence, etc., of the identified faces. The optional adjustable threshold may be used to define which of the identified faces should be included in the first area of interest. That is, in some embodiments, the optional adjustable threshold may be used to determine which of the identified faces rise to the level of a type of activity that should not be obstructed by the additional content that will be inserted. Thus, in some embodiments, the identified faces may be thought of as a type of activity if the identified faces meet a threshold setting.

In step 408 a determination is made as the whether an insertion area exists in the image where additional content can be inserted without obstructing the first area of interest. That is, in some embodiments a determination is made as the whether there is an area in the image, referred to herein as an insertion area, where additional content can be inserted without obstructing a view of the first area of interest. If such an insertion area exists, then in some embodiments additional content, such as for example advertisements, can be inserted into the insertion area, and such additional content will not obstruct a view of the first area of interest.

Figure 5A:
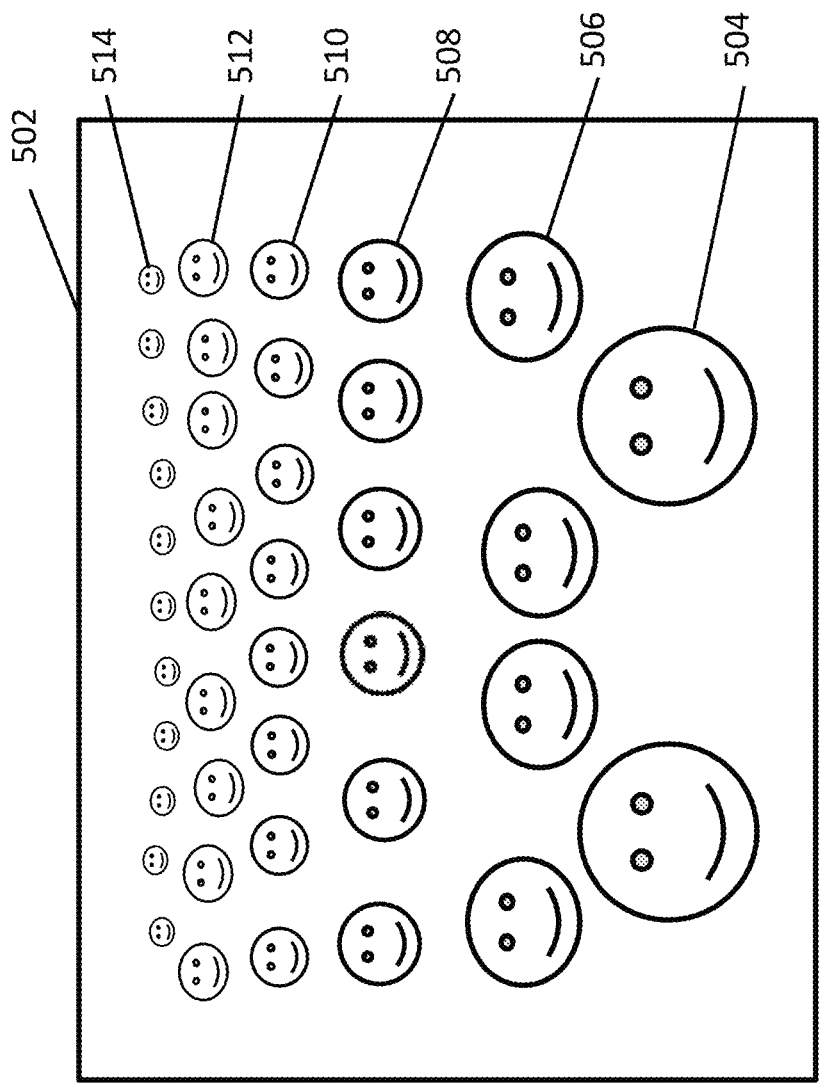
FIGS. 5A, 5C, and 5D are screen shots.

An example application of the method 400 will now be described with reference being made to FIGS. 5A, 5B, 5C, and 5D. Specifically, FIG. 5A illustrates an image 502 that is analyzed. As illustrated the image 502 includes several faces. In some embodiments, a crowd of faces may be analyzed. One or more face recognition techniques or face recognition technologies are used to identify one or more faces in the image 502. The identified faces have several different sizes. Namely, there are some large faces 504, some small faces 514, and several faces 506, 508, 510, and 512 having various sizes between the largest and smallest faces.

In some embodiments, the next step is to designate at least one of the identified faces as a first area of interest. As mentioned above, in some embodiments, the designation as a first area of interest means that this is an area that a viewer would likely be interested in seeing, and so the area should not be obstructed by the additional content that will be inserted. In some embodiments, the size of the faces are used to determine which of the identified faces should be designated as the first area of interest. For example, it is believed that a viewer would likely be more interested in seeing the larger faces in the image than the smaller faces. It is further believed that the larger faces were likely the main subject matter that was intended to be captured in the image. As such, designating the larger faces as the first area of interest means that they will not be obstructed (or covered) by the additional content, such as one or more advertisements, that will be inserted.

Thus, in some embodiments the step of designating at least one of the identified faces collectively as the first area of interest includes the step of determining a size of each of the identified faces. After the size of each of the identified faces is determined, the identified faces that are to be included in the first area of interest are then selected based on the sizes of the identified faces.

In some embodiments, the process of selecting faces based on the sizes of the identified faces may utilize a threshold setting. Specifically, the optional threshold setting can be set to define the size of the identified faces that will be included in the first area of interest. In some embodiments, the optional threshold setting can be used to select faces for inclusion in the first area of interest based on whether a face is a certain proportion to other faces. The optional threshold setting may define the proportion, which in some embodiments may be set by a user, or may be set by an application, or may be set automatically, or may be set in some other manner.

Figure 5B:
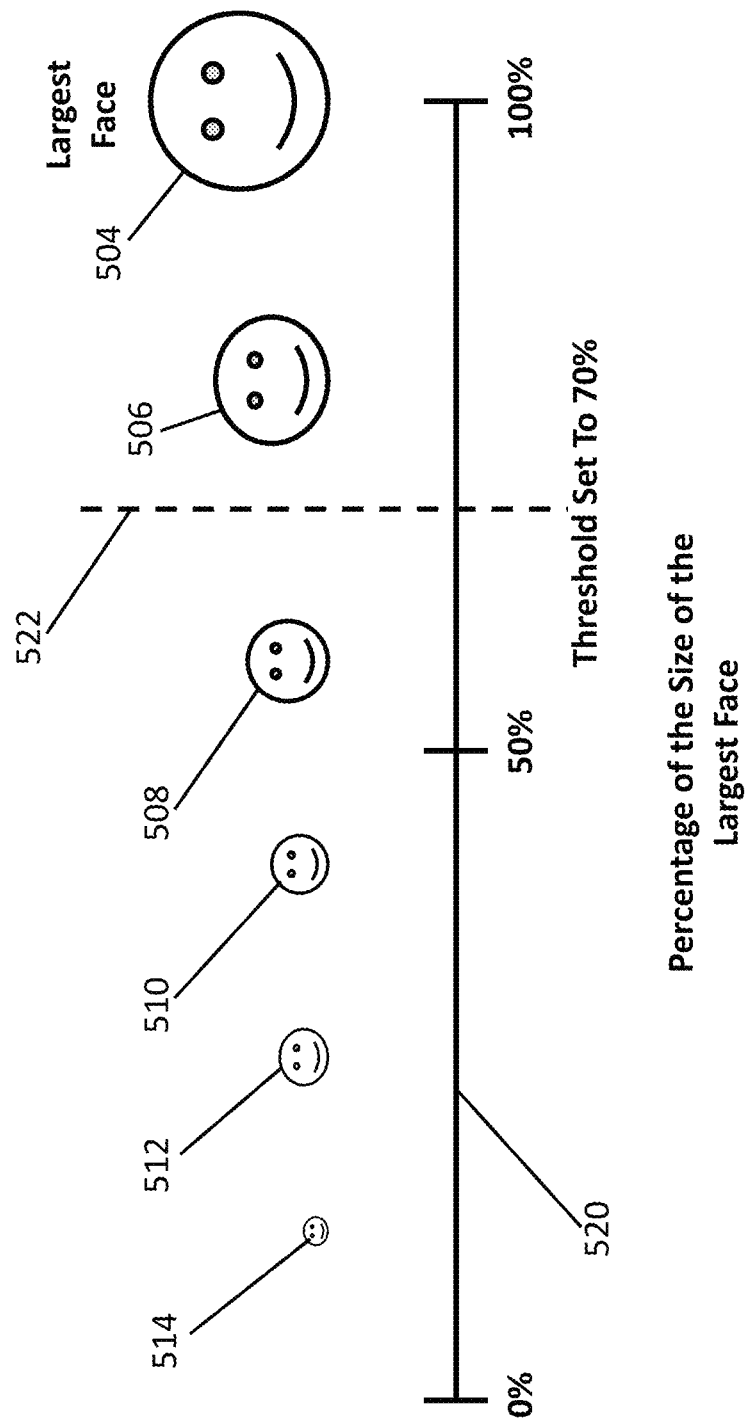
FIG. 5B is a sizing and threshold setting diagram, all illustrating an example application of the method of FIG. 4 in accordance with an embodiment of the present invention.

FIG. 5B illustrates an example of one embodiment of the optional threshold setting. In this embodiment the threshold setting represents a certain percentage of the largest one of the identified faces. As such, the process of selecting at least one of the identified faces to be included in the first area of interest based on the sizes of the identified faces may begin with identifying a largest one of the identified faces. In the illustrated example, the largest one of the identified faces is the face 504.

In some embodiments, the optional threshold setting may be adjusted using a threshold slider 520. In this example, the threshold slider 520 runs between 0% and 100% of the size of the largest face 504. As illustrated, in this example, the threshold setting 522 is set to 70%. This means that only the identified faces that are at least as large as 70% of the size of the largest face 504 will be included in the first area of interest. Thus, in this example, the faces 504 and 506 will be included in the first area of interest, and the faces 508, 510, 512, and 514 will not be included in the first area of interest. The faces 508, 510, 512, and 514 are not included in the first area of interest because they are smaller than 70% of the size of the largest face 504. Thus, in some embodiments, it is okay to place additional content over the faces 508, 510, 512, and 514 because they are not included in the first area of interest. That is, the cutoff is any face that is less than 70% of the size of the largest face is okay for additional content placement.

Thus, in the illustrated example, the faces that are selected to be included in the first area of interest are the largest one of the identified faces (i.e. face 504) and only the identified faces that are not smaller than a certain percentage (i.e. 70%) of the largest one of the identified faces (i.e. face 506). Basically, if it is a face that meets the threshold, then that is akin to the activity in a scene described above and it should not be blocked by additional content, such as an advertisement. But if a face does not meet the threshold, e.g. maybe a face is only ⅟₃₂ the size of the biggest face, then it may be okay to open that space up for the insertion of additional content, such as advertisement.

Figure 5C:
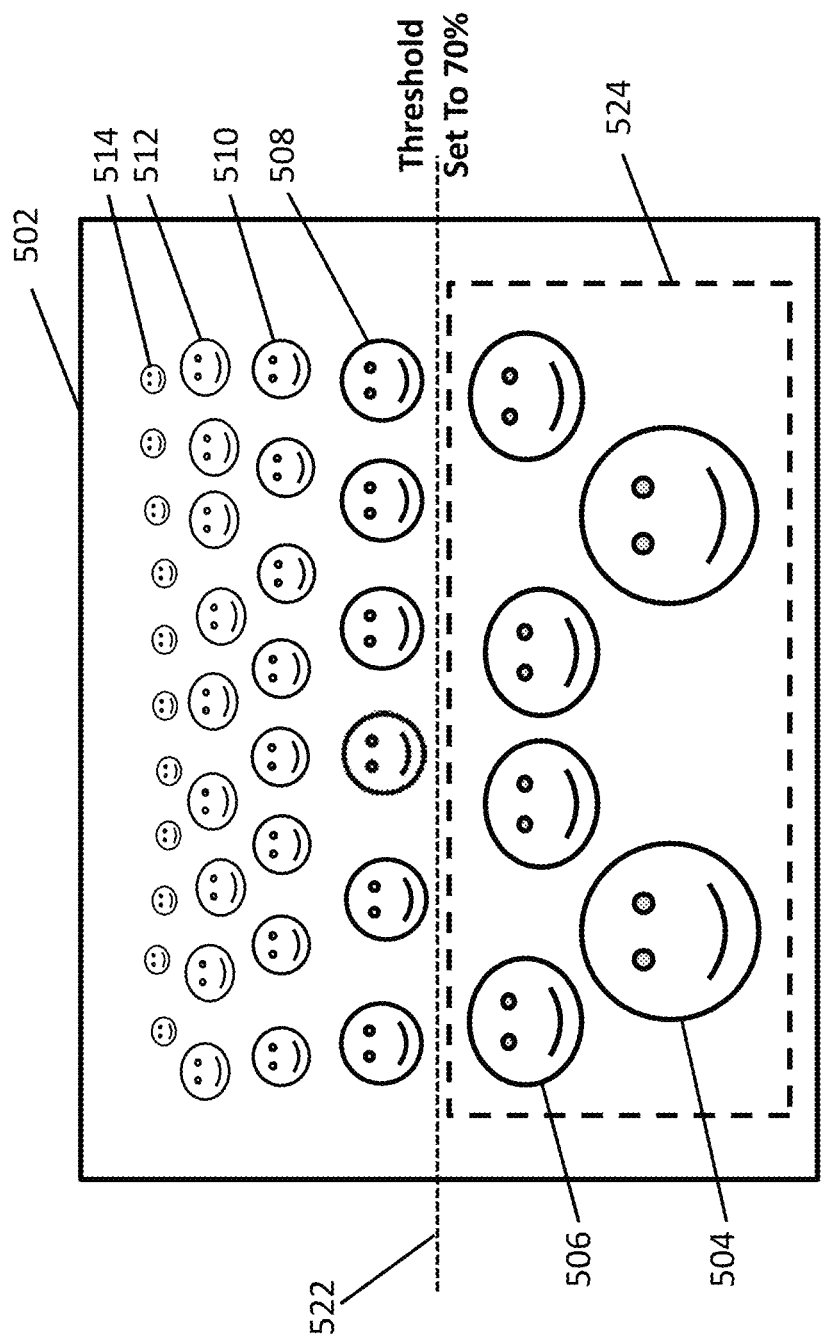

FIG. 5C illustrates the image 502 with the first area of interest 524 identified. As illustrated, the faces 504 (two of them) and the faces 506 (four of them) are included in the first area of interest 524. The example threshold setting 522 of 70% is also illustrated. As can be seen, none of the faces 508 (six of them), 510 (eight of them), 512 (nine of them), and 514 (eleven of them) are included in the first area of interest 524 because they are smaller than 70% of the size of the largest face 504.

It should be well understood that the threshold setting 522 may be set to any value. Namely, the threshold setting 522 may be set to any value from 0% to 100%. For example, if the threshold setting 522 is set to 50% instead of 70%, then according to FIG. 5B the faces 508 (six of them) would also be included in the first area of interest 524. As another example, if the threshold setting 522 is set to 100% instead of 70%, then the only faces that would be included in the first area of interest 524 would be the faces 504 (two of them) since they are the same size, are the largest faces, and are not smaller than 100% of the size of the largest one of the identified faces.

It should also be well understood that the threshold setting 522 may be based on any measure and does not have to be a percentage. For example, the threshold setting 522 may be based on the diameter, radius, circumference, etc., of the faces. Or, the threshold setting 522 may be based on any other measure.

It should also be well understood that the threshold setting 522 may be set and/or adjusted in a wide variety of ways. In some embodiments, the threshold setting 522 may be set and/or adjusted by a user. For example, the threshold setting 522 may be set and/or adjusted manually by a user. Thus, in the illustrated example the certain percentage of the threshold setting 522 would be designated by a user. In some embodiments, the threshold setting 522 may be set and/or adjusted by an application, such as a software application. For example, the threshold setting 522 may be set and/or adjusted automatically by an application. The automatic setting and/or adjusting of the threshold setting 522 may be based on a wide variety of conditions, parameters, variable, factors, etc.

In some embodiments, after the first area of interest 524 has been designated, a determination may be made as the whether an insertion area exists in the image 502 where additional content can be inserted without obstructing the first area of interest 524. In some embodiments, any area on the image 502 outside of the first area of interest 524 may comprise an insertion area. For example, in the illustrated embodiment, any area on and around the faces 508, 510, 512, and 514 that does not cover or obstruct the view of any portion of the first area of interest 524 may comprise an insertion area.

Figure 5D:
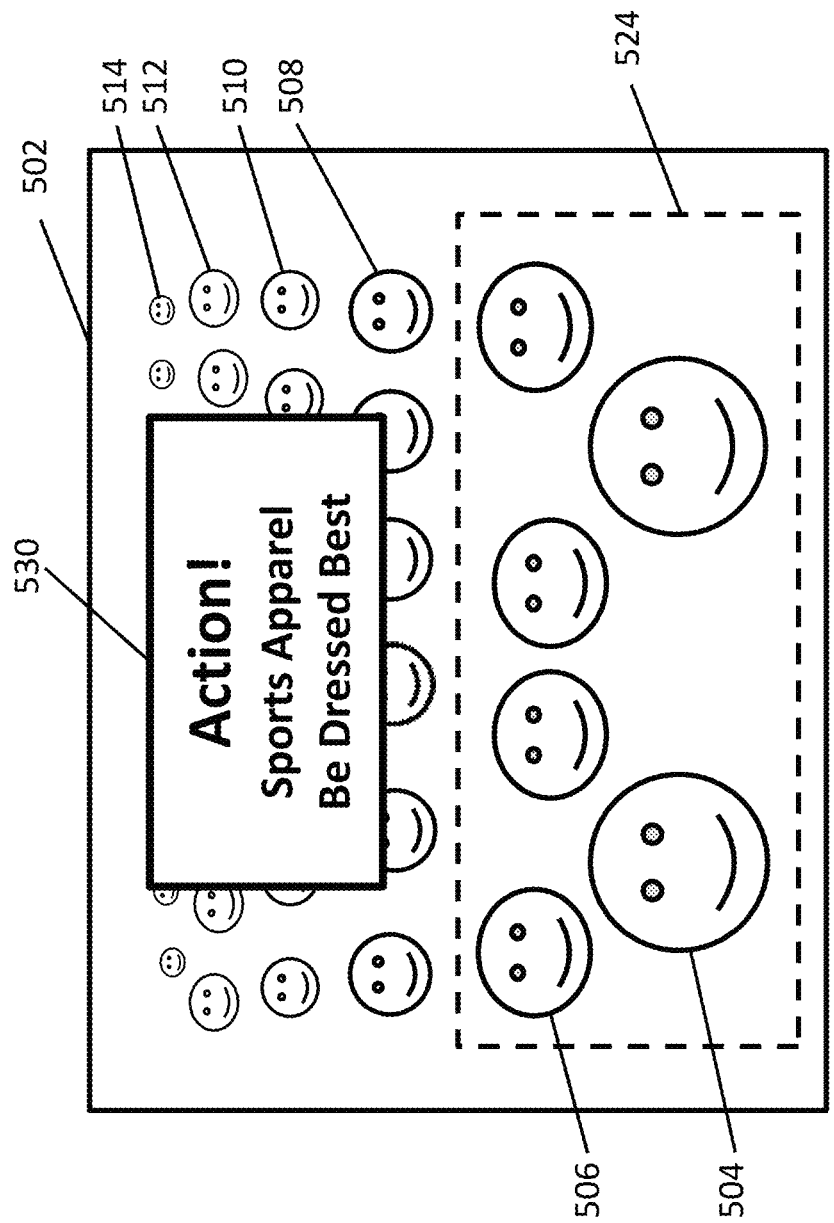

In some embodiments, the next step is to insert additional content into the insertion area. FIG. 5D illustrates an example of the insertion of additional content into an insertion area in the image 502. Specifically, in this example the additional content comprises an advertisement 530 for "Action! Sports Apparel". The advertisement 530 is placed over some of the faces 508, 510, 512, and 514 and does not obstruct the view of any portion of the first area of interest 524. It should also be well understood that the additional content may comprise any type of content and not just advertisements.

Figure 6A:
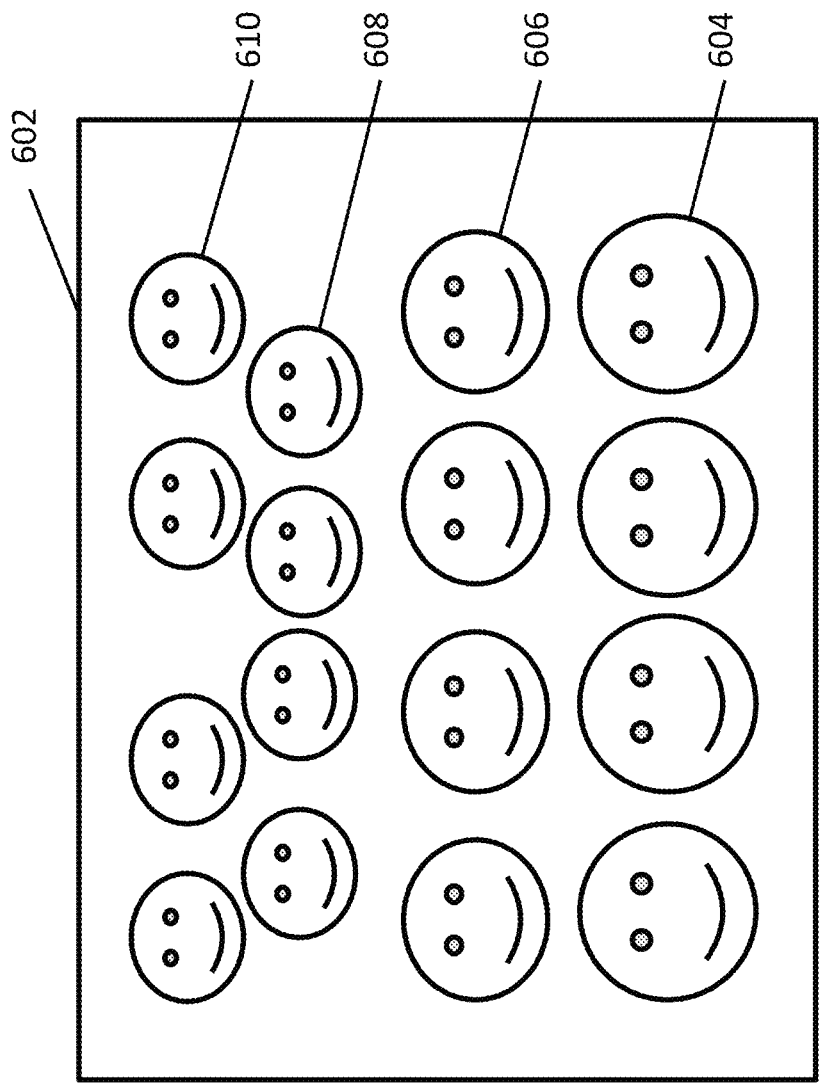
FIGS. 6A and 6B are screen shots illustrating another example application of the method of FIG. 4 in accordance with an embodiment of the present invention.
Figure 6B:
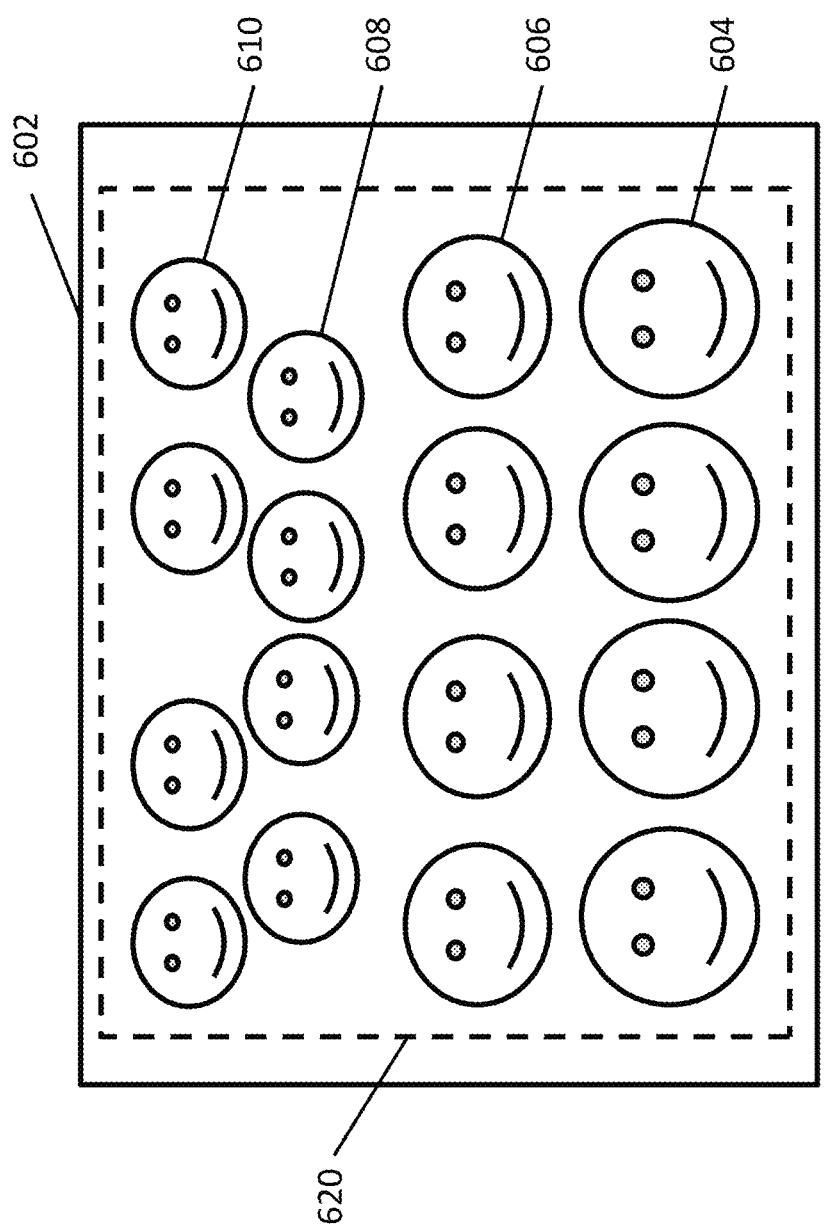

In some scenarios an image might not include an insertion area. For example, if the first area of interest is large and takes up a large portion of the image, then a large enough insertion area might not exist in the image. FIGS. 6A and 6B illustrate such an example. Specifically, an image 602 is illustrated. Using the above described methods and techniques, the image 602 is analyzed. Several faces 604, 606, 608, and 610 are identified using a face recognition technique or face recognition technology.

In this particular image 602, the identified faces 604, 606, 608, and 610 do not differ much in size. Thus, if a first area of interest is designated or defined based on the size of the faces, it is possible that all the faces 604, 606, 608, and 610 could be included in the first area of interest. In some embodiments, this possibility would depend on the threshold setting. For example, in embodiments that use the above-described optional threshold setting, if the threshold setting is set to a value such as 50%, then all the faces 604, 606, 608, and 610 would be included in the first area of interest. This is because all the faces 606, 608, and 610 are at least as large as 50% of the size of the largest face 604. That is, none of the identified faces are smaller than 50% of the size of the largest face 604.

FIG. 6B illustrates the first area of interest 620 that has been designated in the image 602 in this particular example. As illustrated, all of the faces 604 (four of them), 606 (four of them), 608 (four of them), and 610 (four of them) are included in the first area of interest 620. And as illustrated, the first area of interest 620 takes up most of the space in the image 602. As such, in this particular example the image 602 does not include an insertion area. Thus, there is no place to insert additional content, which means that none of the faces will be covered up or obstructed by additional content.

In the above examples, the size of the faces are used to determine which of the identified faces should be designated as the first area of interest. In some embodiments, the amount of focus, or sharpness of the focus, of the faces may alternatively or additionally be used to determine which of the identified faces should be designated as the first area of interest. As mentioned above, in some embodiments, the designation as a first area of interest means that this is an area that a viewer would likely be interested in seeing, and so the area should not be obstructed by the additional content that will be inserted. It is believed that a viewer would likely be more interested in seeing the faces that are more in focus than the faces that are less in focus. It is further believed that the faces with sharper focus were likely the main subject matter that was intended to be captured in the image. As such, designating the faces that are more in focus as the first area of interest means that they will not be obstructed (or covered) by the additional content, such as one or more advertisements, that will be inserted. In some embodiments, the optional threshold setting discussed above may be used to set the amount of focus, or the sharpness of the focus, that will qualify a face to be included in the first area of interest. Thus, in some embodiments, if a face meets a threshold level of being in focus, then that is akin to the activity in a scene described above and it should not be blocked by additional content, such as an advertisement. That is, in some embodiments, faces that meet a threshold level of being in focus are akin to activity in the scene.

In some embodiments the images 502 (FIG. 5A) and 602 (FIG. 6A) may each comprise a still photograph or picture. In some embodiments the images 502 and 602 may each comprise one frame in a sequence of frames of content. For example, the images 502 and 602 may each comprise one frame of video type content. In such embodiments, a sequence of frames of the content may be analyzed using the techniques described above with respect to FIGS. 5A-5D.

For example, in such embodiments the step of identifying one or more faces in the image may comprise identifying one or more faces in a scene depicted by the sequence of frames. And the step of determining whether an insertion area exists in the image where additional content can be inserted without obstructing the first area of interest may comprise determining whether an insertion area exists in the scene where additional content can be inserted without obstructing the first area of interest.

Furthermore, in some embodiments if an insertion area does exist in the scene depicted by the sequence of frames, then an amount of time that the insertion area is available when the sequence of frames is being played may be determined. And in some embodiments, a size of the insertion area may be determined.

Figure 7:
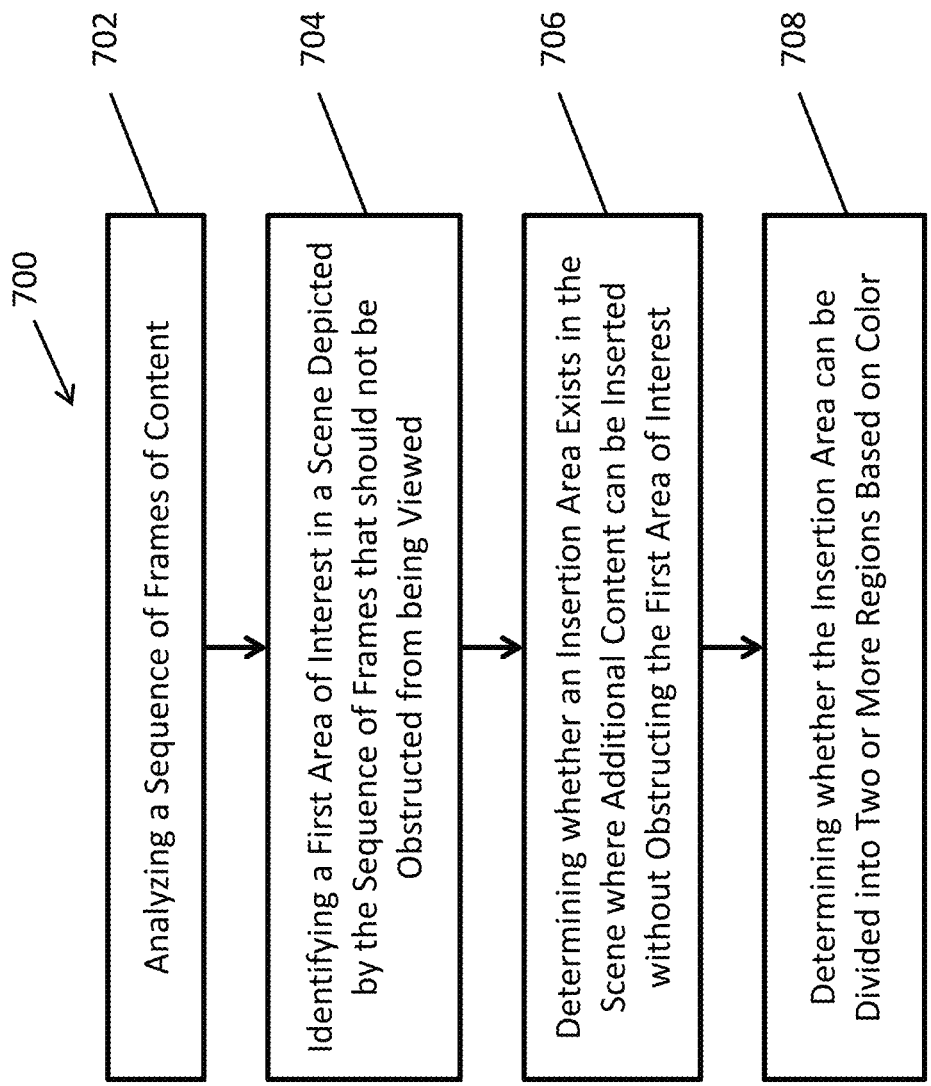
FIG. 7 is a flow diagram illustrating a method for use with content in accordance with another embodiment of the present invention.

Referring to FIG. 7, there is illustrated an example of a method 700 that operates in accordance with another embodiment of the present invention. In some embodiments, the method 700 may also be used for determining the location and timing of additional content, such as advertisements, that is to be inserted into media.

The method 700 begins in step 702 in which a sequence of frames of content is analyzed. Such content may include any type of content, such as for example television shows, movies, videos, web pages, games, etc., or any video type content.

In step 704 a first area of interest in a scene depicted by the sequence of frames that should not be obstructed from being viewed is identified. In some embodiments, this identification may be made by identifying one or more faces in the scene using a face recognition technique. Namely, in some embodiments, the technique described above of identifying faces in the scene may be used to identify the first area of interest. In some embodiments, the identification of the first area of interest may alternatively or additionally be made by identifying areas in the scene having activity. Namely, in some embodiments, the technique described above of identifying areas in the scene having activity may be used to identify the first area of interest. In some embodiments, the technique described above of identifying areas in the scene having no activity may be used to identify the first area of interest.

In step 706 a determination is made as to whether an insertion area exists in the scene where additional content can be inserted without obstructing the first area of interest. That is, similar to as described above, in some embodiments a determination is made as the whether there is an area in the scene, referred to herein as an insertion area, where additional content can be inserted without obstructing a view of the first area of interest. If such an insertion area exists, then in some embodiments additional content, such as for example advertisements, can be inserted into the insertion area, and such additional content will not obstruct a view of the first area of interest.

In step 708 a determination is made as to whether the insertion area can be divided into two or more regions based on color. Namely, sometimes an insertion area is identified that spans across two or more regions that generally have different colors. In such a scenario, in some embodiments, it might be preferable to insert the additional content into only one of those regions so that the additional content does not cover or extend into two or more regions that have substantially different colors. Therefore, in some embodiments the insertion area is further analyzed and subdivided or broken into one or more regions, sub-regions, or categories based on the colors in the scene.

Figure 8A:
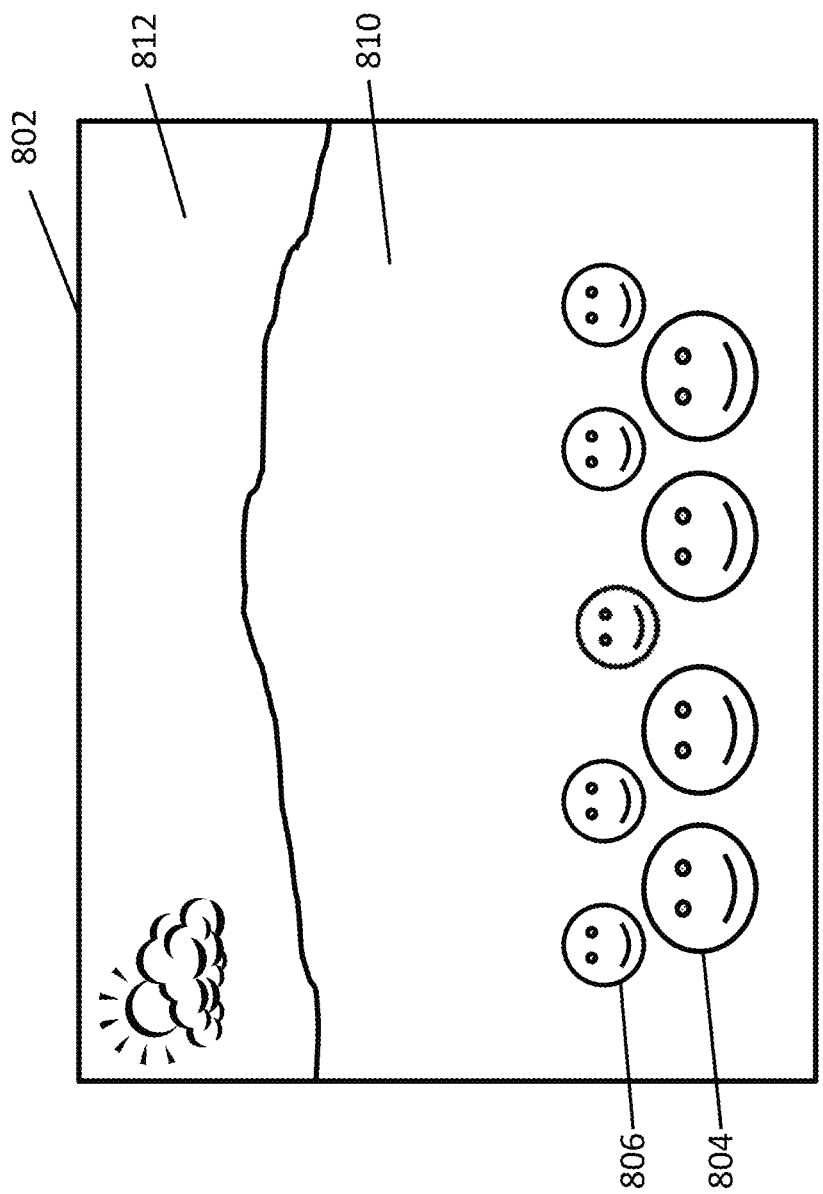
FIGS. 8A, 8B, 8C, 8D, 8E, 8F, 8G, and 8H are screen shots illustrating an example application of the method of FIG. 7 in accordance with an embodiment of the present invention.

An example application of the method 700 will now be described with reference being made to FIGS. 8A, 8B, 8C, 8D, 8E, 8F, 8G, and 8H. Specifically, FIG. 8A illustrates a scene 802 that is depicted by a sequence of frames of content. As illustrated the scene 802 includes several faces 804 and 806. The scene 802 also includes a green grassy hill 810 behind the faces, and a blue sky 812 above the hill.

Figure 8B:
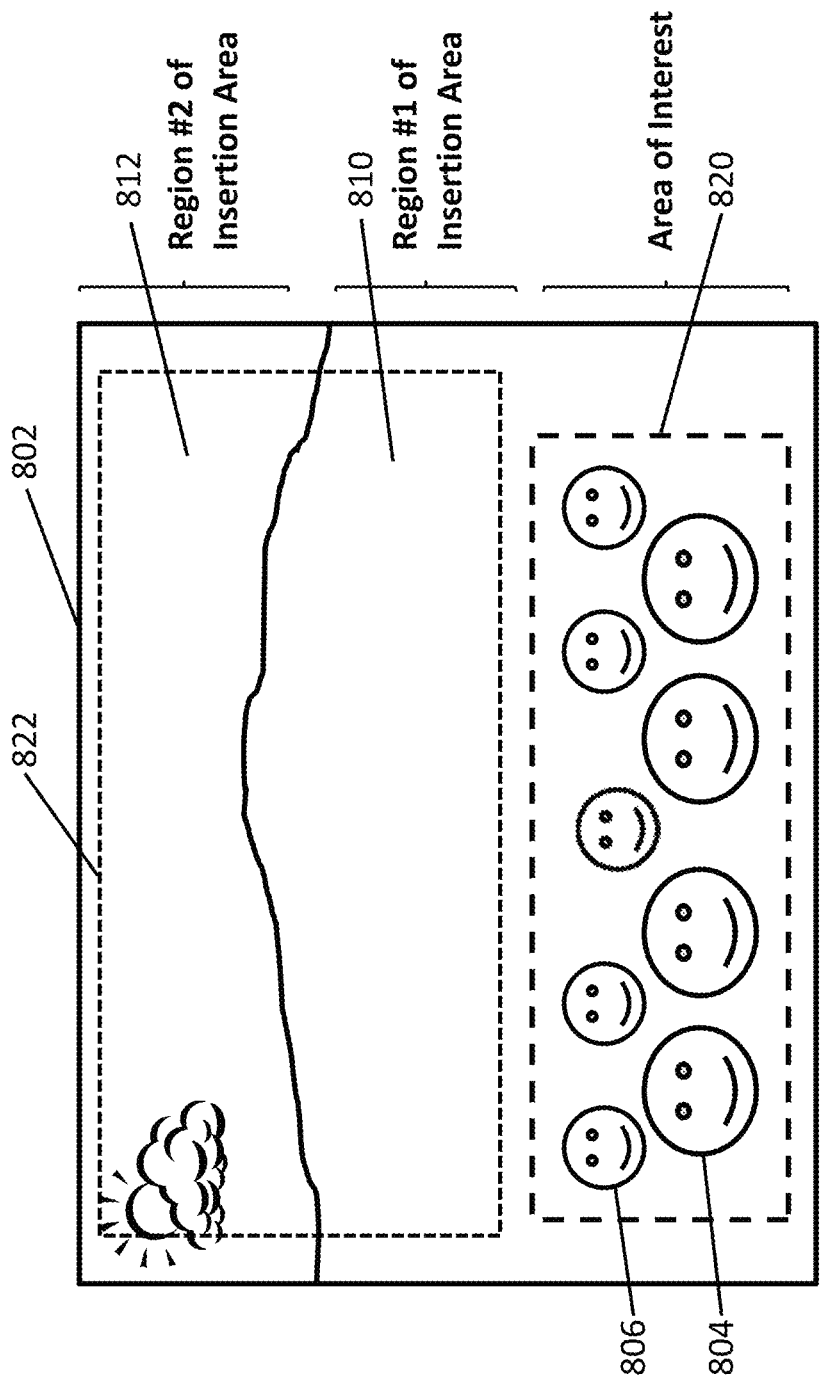

In accordance with some embodiments, the sequence of frames of content that depict the scene 802 are analyzed. Specifically, a first area of interest in the scene 802 that should not be obstructed from being viewed is identified. As mentioned above, in some embodiments the technique described above of identifying faces in the scene may be used to identify the first area of interest. Specifically, in this example one or more face recognition techniques or face recognition technologies are used to identify the one or more faces 804 and 806 in the scene 802. Referring to FIG. 8B, the result of the face recognition process is that the faces 804 and 806 are designated as a first area of interest 820.

Next, a determination is made as to whether an insertion area exists in the scene 802 where additional content can be inserted without obstructing the first area of interest 820. The result of this determination is that the area spanning the green grassy hill 810 and the blue sky 812 are identified as an insertion area 822.

A determination is then made as to whether the insertion area 822 can be divided into two or more regions based on color. In this particular example, the insertion area 822 can be divided into two such regions. Namely, the area of the green grassy hill 810 can form a first region of the insertion area 822, and the area of blue sky 812 can form a second region of the insertion area 822. The identification of these two regions is based on color, namely, the green hill 810 and the blue sky 812. Thus, as illustrated the insertion area 822 is divided into two regions based on color, namely the area of the green grassy hill 810 forming a first region, and the area of the blue sky 812 forming a second region.

It is believed that inserted additional content has a better appearance if it does not overlap regions that have different colors. That is, in some embodiments it is believed that the inserted additional content will have a better appearance if it does not straddle sub-regions. For example, if the inserted additional content is contained within one region, then the color and appearance of the inserted additional content can more easily be chosen such that it blends well with the region. Namely, the additional content, such as advertisements, can be selected so that the additional content matches the artistic chromagraphic aspect of the sub-region.

Figure 8C:
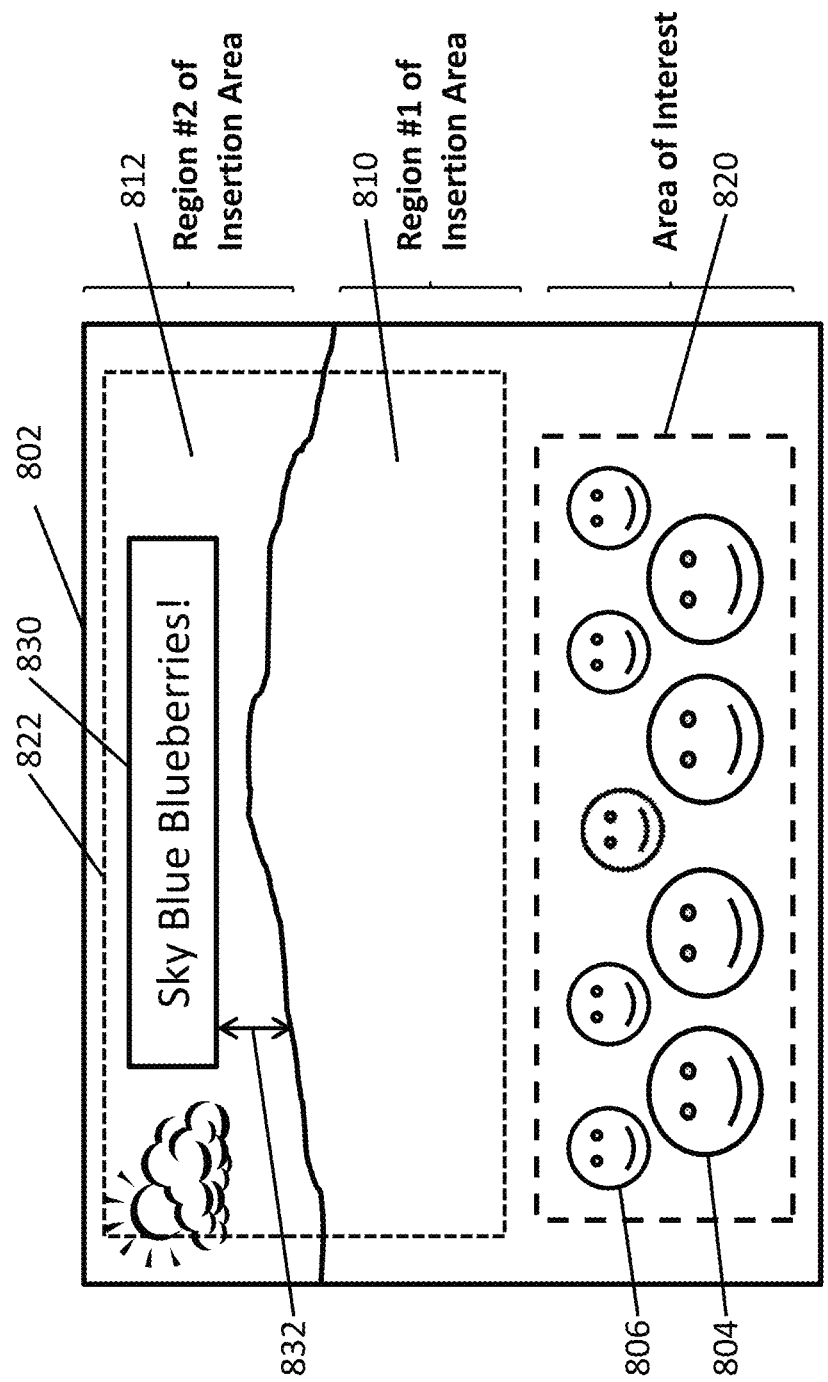

Next, in some embodiments, additional content is inserted into one of the two or more regions such that the additional content is completely contained within the one of the two or more regions. FIG. 8C illustrates the insertion of additional content into the scene 802. Specifically, in this example the additional content comprises an advertisement 830 for "Sky Blue Blueberries!" that has been inserted into the second region comprising the area of the blue sky 812. As illustrated, the advertisement 830 is completely contained within the blue sky 812 region and does not extend beyond that region.

In some embodiments, a buffer area may be maintained between the additional content and an edge of the one of the two or more regions. That is, the additional content, such as an advertisement, may be placed such that it stays within a certain buffer area of that region. Such a buffer area can provide an offset of a certain amount, such as for example 0.25", 0.5", 0.75", 1", etc., or any other amount. A buffer area is a type of restricted area that keeps the additional content from getting too close to the edges of the region. For example, a buffer area helps keep an advertisement from being too close to the edge of a region. Buffer areas may be maintained between all sides of the additional content and all edges of the region.

As illustrated in the present example, a buffer area 832 is maintained around the advertisement 830 so that it does not get too close to the edge of the region. The buffer area 832 may comprise any chosen, selected, predetermined, variable, dynamic, etc., size or amount of space. The buffer area 832 may comprise one value or setting for horizontal edges of the region, and the same or different value or setting for vertical edges of the region.

In some embodiments, the additional content is selected at least partly based on the color of the one of the two or more regions. For example, in the illustrated embodiment the advertisement 830 is for "Sky Blue Blueberries!". Because the blue sky 812 region is blue in color, the advertisement "Sky Blue Blueberries!" was chosen based on the blue color because it is believed that it might provide an effective advertisement. That is, the idea of blueberries on a blue background might appeal to some consumers. Furthermore, in some embodiments, the advertisement 830 itself could be blue in color, or have some blue color in it, or include some shades of blue or other colors that go well with blue. Such color choices are believed to help the advertisement 830 blend or fit in well with the region and make the advertisement look more natural in appearance.

Figure 8D:
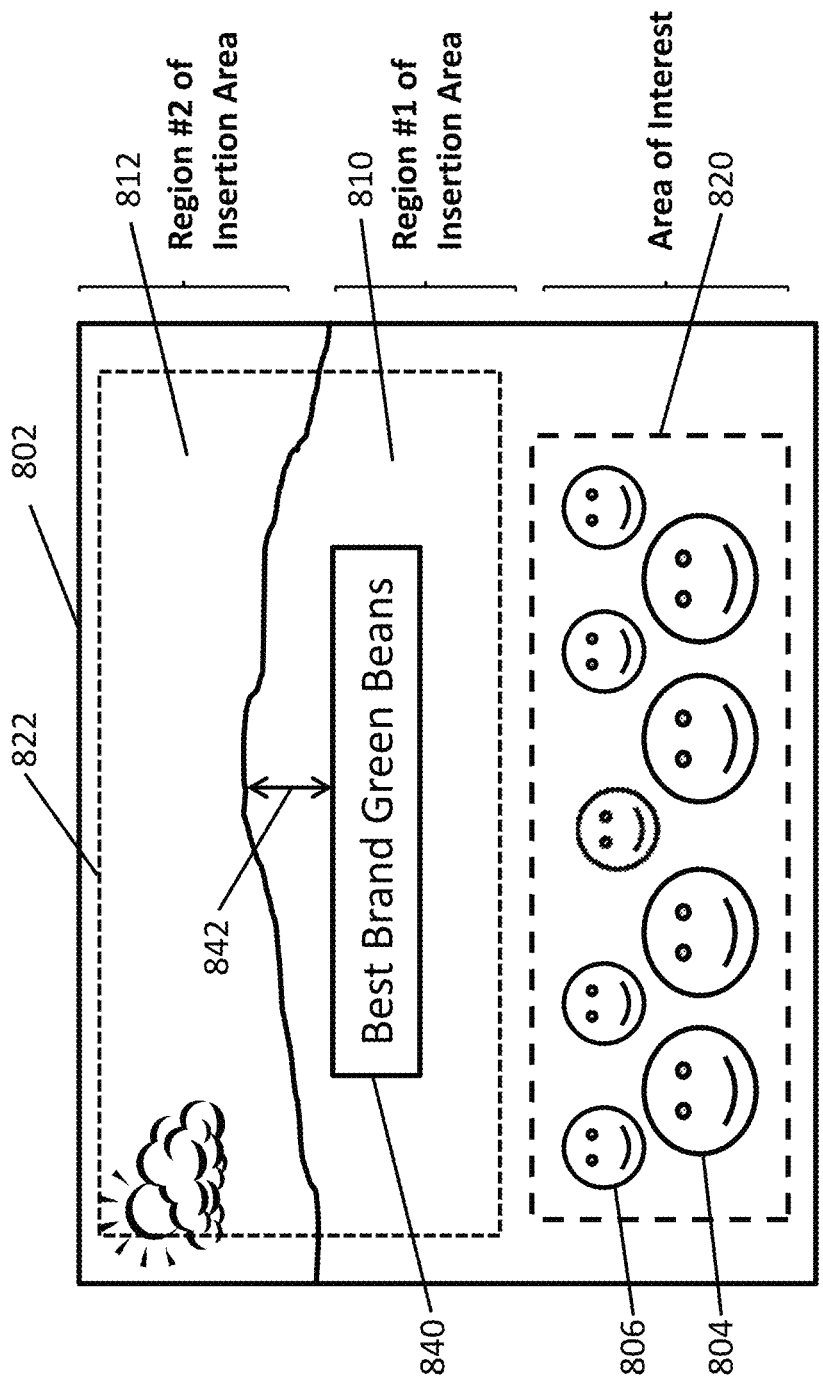

FIG. 8D illustrates another example embodiment where additional content is inserted into one of the two or more regions such that the additional content is completely contained within the one of the two or more regions. Specifically, in this example the additional content comprises an advertisement 840 for "Best Brand Green Beans" that has been inserted into the first region comprising the area of the green grassy hill 810. As illustrated, the advertisement 840 is completely contained within the green grassy hill 810 region and does not extend beyond that region. Furthermore, as illustrated a buffer area 842 is maintained around the advertisement 840 so that it does not get too close to the edge of the region. As mentioned above, the buffer area 842 may comprise any chosen, selected, predetermined, variable, dynamic, etc., size or amount of space. Furthermore, the buffer area 842 may comprise one value or setting for horizontal edges of the region, and the same or different value or setting for vertical edges of the region.

In this example, the advertisement 840 is for "Best Brand Green Beans", which was selected at least partly based on the green color of the region. Namely, because the green grassy hill 810 region is green in color, the advertisement "Best Brand Green Beans" was chosen based on the green color because it is believed that it might provide an effective advertisement. That is, the idea of green beans on a green background might appeal to some consumers. Furthermore, in some embodiments, the advertisement 840 itself could be green in color, or have some green color in it, or include some shades of green or other colors that go well with green. Such color choices are believed to help the advertisement 840 blend or fit in well with the region and make the advertisement look more natural in appearance.

Figure 8E:
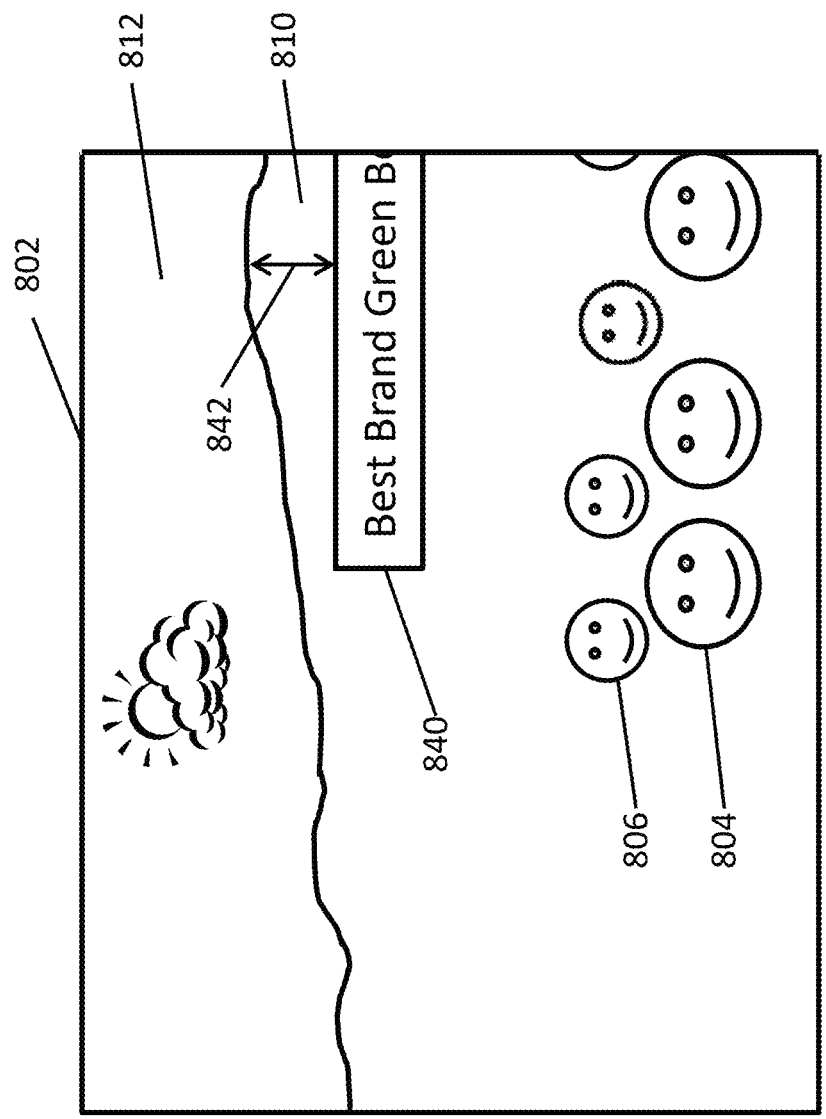

As the camera moves around and the camera view of the scene 802 changes, the sizes of the regions change as well. One option is the keep the additional content fixed in the region. Thus, in some embodiments, the additional content is placed so that it is fixed in the one of the two or more regions in the scene and is not allowed to move in the scene. That is, the additional content is not allowed to float or move when the camera view changes. FIG. 8E illustrates an example of this feature for the scene 802. As illustrated the camera view has moved to the left. The advertisement 840 is fixed or pinned to the green hillside 810, and when the camera moves the advertisement 840 goes off screen. That is, the advertisement 840 moves partially off the right side of the screen because the advertisement 840 is fixed on the green hill 810. Thus, in this embodiment the advertisement 840 is fixed and does not move with the camera view.

Figure 8F:
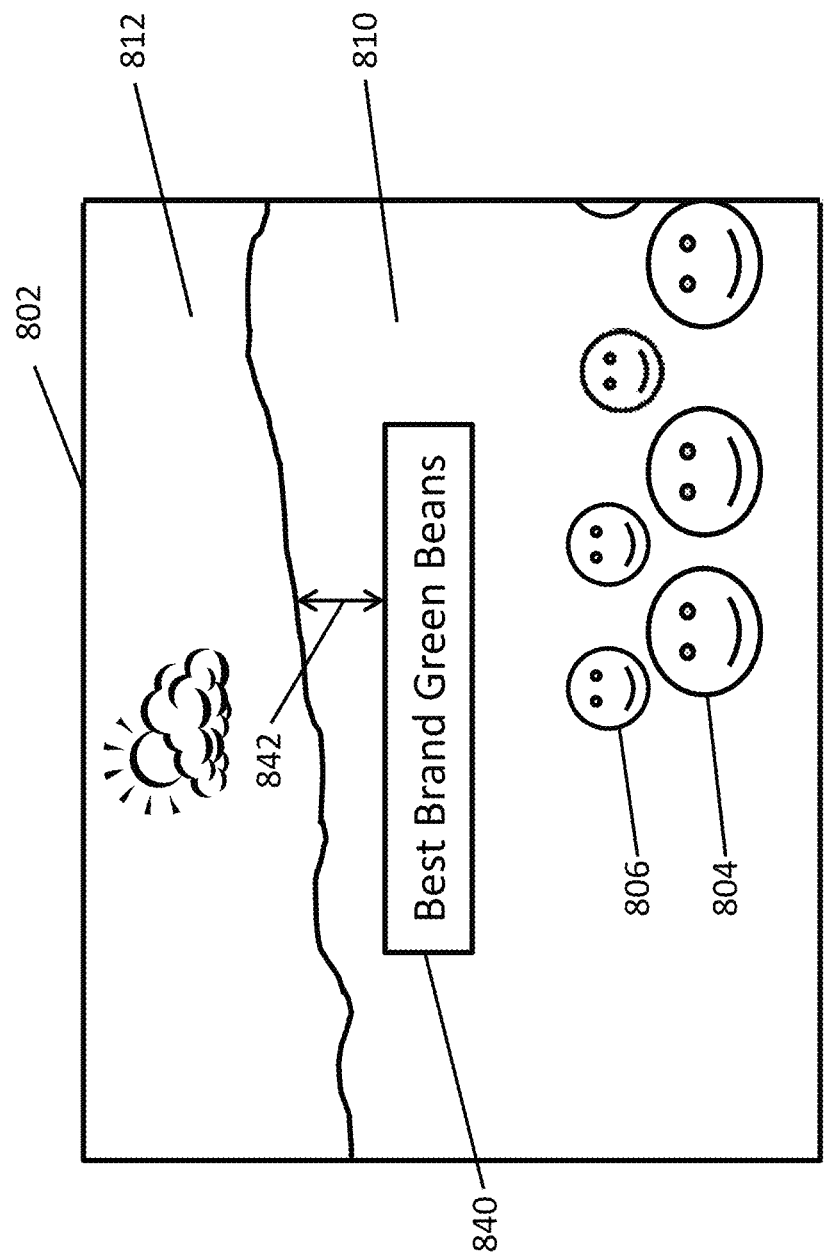

Another option for camera movement is to let the additional content float so that it stays generally within the buffer areas of the region. Thus, in some embodiments, the additional content is placed so that it is allowed to move within the one of the two or more regions in the scene. That is, the additional content is allowed to float or move when the camera view changes. FIG. 8F illustrates an example of this feature for the scene 802. As illustrated the camera view has moved to the left by about the same amount as in FIG. 8E. This time the advertisement 840 is still fully visible in the scene because it has also moved, or floated, with the camera movement. That is, in this embodiment the advertisement 840 did not move off screen when the camera view moved because the advertisement is allowed to move, or float, with movements of the camera view.

Because in this embodiment the advertisement 840 is moving, such movement can also include, in some embodiments, maintaining a desired buffer area 842 between the advertisement 840 and the edge of the green grassy hill 810 region. A desired buffer area 842 can be maintained around the entire advertisement 840 so that it does not get too close to the edge of the region. In some embodiments, the size of the buffer area 842 is dynamically adjusted to accommodate movement of the advertisement 840 with movement of the camera view. For example, the buffer area 842 may be adjusted so that the advertisement 840 stays generally within the center of the region, but this is not required. As the camera moves, the advertisement 840 moves with the camera so that the advertisement 840 stays on the hillside. The advertisement 840 may be kept centered in the region or within the buffer area so that the viewer continues to see it as the camera moves.

And yet another option for camera movement in some embodiments is to initially fix the additional content, and then let it float a little to catch up with the camera movement. It is believed that this would get a viewer's attention, which could make an inserted advertisement more effective.

As mentioned above, in some embodiments a buffer area may be maintained all the way around an item of additional content. For example, a buffer area may be maintained between the additional content and horizontal edges of the region, and a buffer area may be maintained between the additional content and vertical edges of the region. In some embodiments, the size of the buffer areas may be set such that the additional content is centered within the region. For example, the additional content may be centered only vertically within the region, or centered only horizontally within the region, or centered both vertically and horizontally within the region. It should be well understood, however, that such centering is not required. For example, in some embodiments, the additional content may be positioned closer to any desired edge or edges of the region. Furthermore, in some embodiments, the region may not be rectangular or square in shape. As such, buffer areas may be maintained between the additional content and any edges of a region having any shape.

Figure 8G:
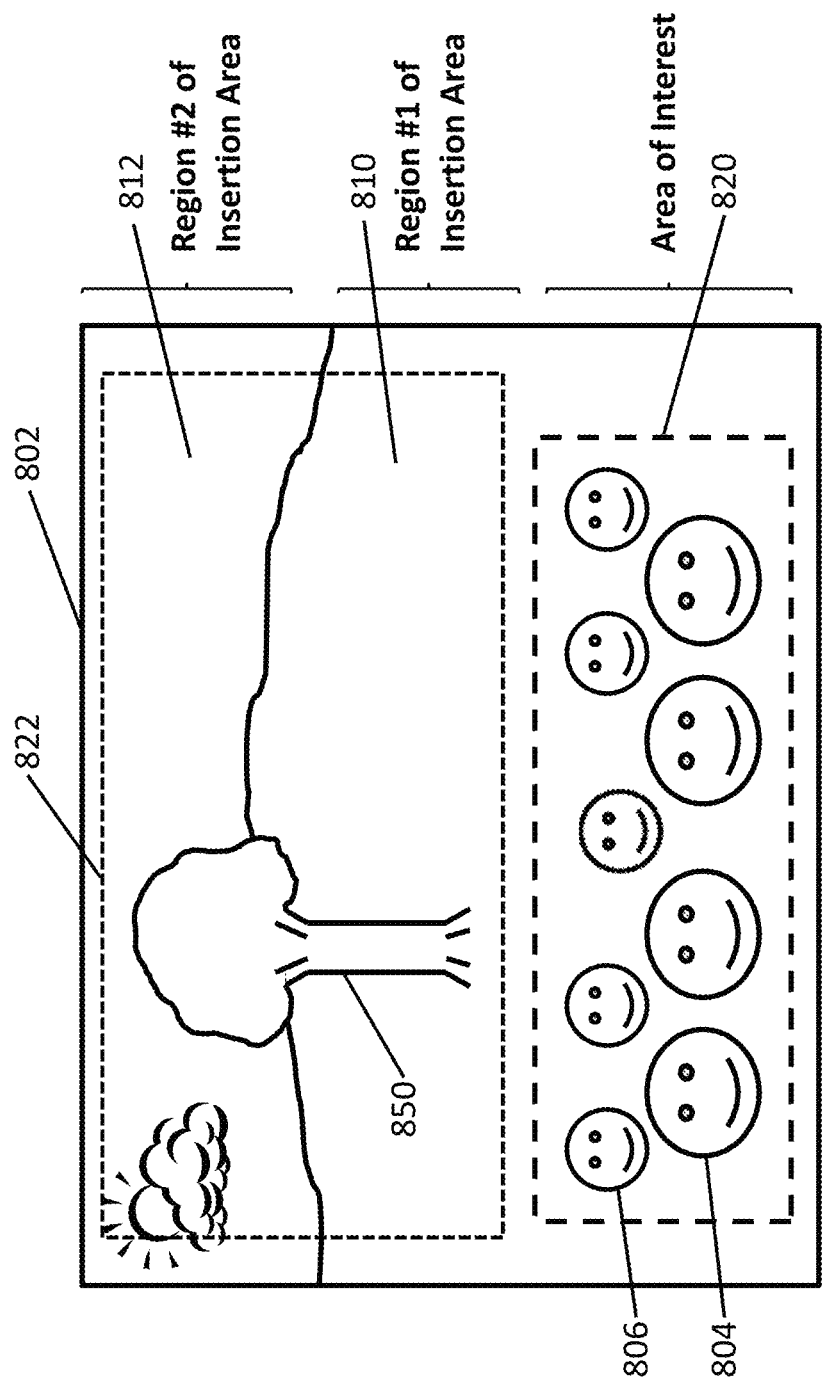
Figure 8H:
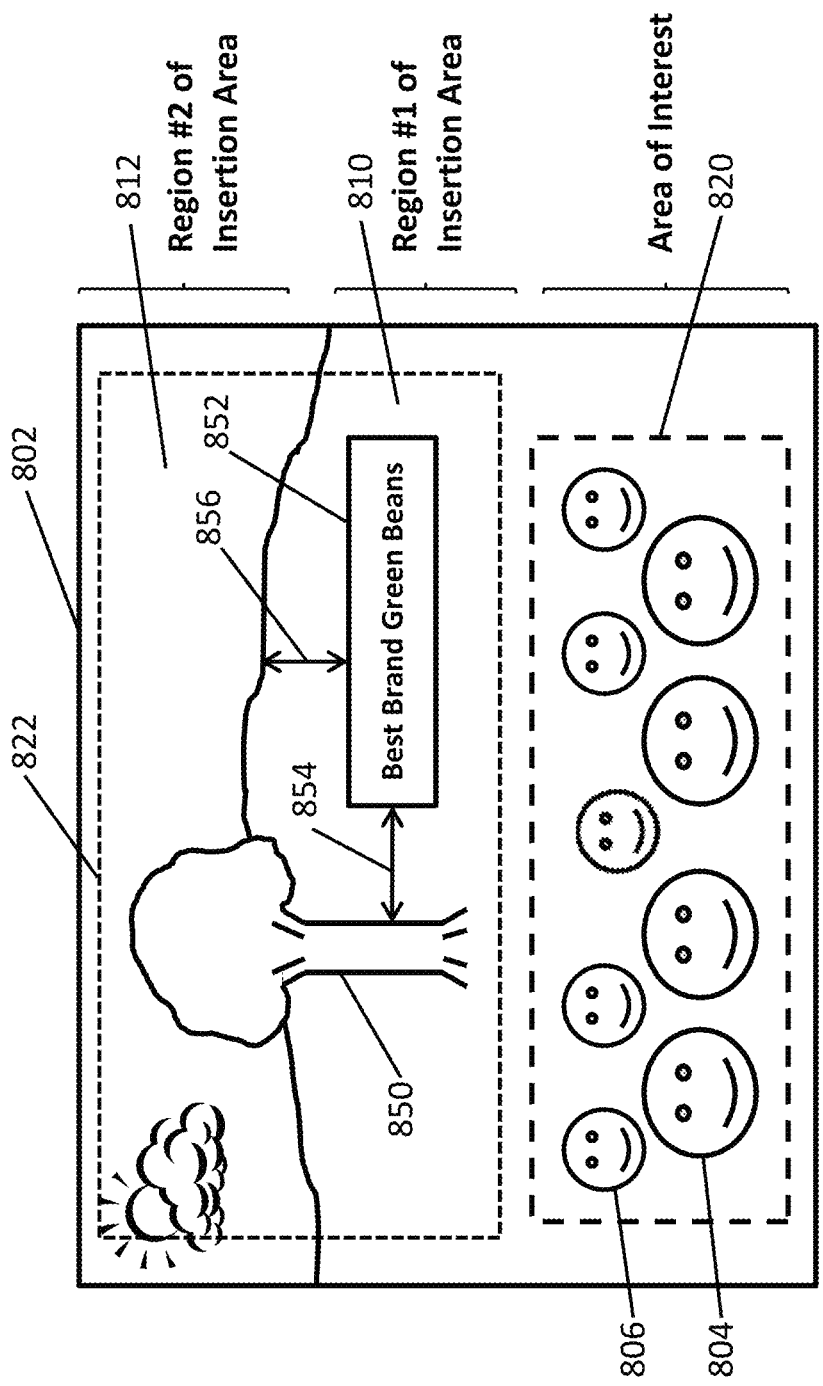

FIGS. 8G and 8H illustrates an example of the use of both horizontal and vertical buffer areas. Specifically, the scene 802 includes the first area of interest 820, the insertion area 822, the green grassy hill 810, and the blue sky 812 as described above. However, in this example a brown tree 850 is located on the green grassy hill 810. The brown tree 850 overlaps both the first region that comprises the area of the green grassy hill 810 and the second region that comprises the area of the blue sky 812. The brown tree 850 has the effect of dividing the first region that comprises the area of the green grassy hill 810, and dividing the second region that comprises the area of the blue sky 812. That is, the tree 850 has the effect of dividing the first region into two smaller regions, and dividing the second region into two smaller regions. The regions are divided because, as discussed above, the regions are defined based on color. As such, the brown tree 850 divides the green grassy hill 810, and the brown tree 850 divides the blue sky 812.

FIG. 8H illustrates an advertisement 852 that has been inserted into the now smaller first region comprising the area of the green grassy hill 810. As illustrated, the advertisement 852 is completely contained within this now smaller region and does not extend beyond that region. Furthermore, as illustrated, buffer areas are maintained all the way around the advertisement 852. The buffer areas may be used to control how close the advertisement 852 gets to the edges of the region.

Specifically, in this embodiment a buffer area 854 is maintained between the advertisement 852 and the vertical edges of the region. In this example, the vertical edges of the region comprise the brown tree 850 on the left side, and the right edge of the insertion area 822 on the right side. A buffer area 856 is also maintained between the advertisement 852 and the horizontal edges of the region. In this example, the horizontal edges of the region comprise the top of the green grassy hill 810 on the upper side, and the lower edge of the insertion area 822 on the lower side.

Similar to as mentioned above, the buffer areas 854 and 856 may comprise any chosen, selected, predetermined, variable, dynamic, etc., size or amount of space. In some embodiments, the buffer areas 854 and 856 do not have to have the same setting or value, and they can be controlled together or separately. Furthermore, in some embodiments the right and left components of the vertical buffer area 854 do not have to have the same setting or value, and they can be controlled together or separately. Similarly, in some embodiments the upper and lower components of the horizontal buffer area 856 do not have to have the same setting or value, and they can be controlled together or separately. In some embodiments, the buffer areas 854 and 856 are controlled and/or set manually by a user. In some embodiments, the buffer areas 854 and 856 are controlled and/or set automatically by an application or program.

As described above, in some embodiments, additional content is inserted into one of the two or more regions such that the additional content is completely contained within the one of the two or more regions. It should be understood, however, that this is not required by all embodiments. Namely, in some embodiments, additional content does not need to be completely contained within the one of the two or more regions and is permitted to extend into, straddle, and/or overlap two or more regions.

Therefore, there has been described above various embodiments of methods that may be used for determining the location and timing of additional content, such as advertisements, that is to be inserted into media. For example, in some embodiments someone may shoot a video, which comprises a sequence of frames of content. A tool that operates in accordance with one or more of the above described methods may be used to analyze the video. In some embodiments, a first area of interest is identified in one frame or image in the video, or in a scene depicted by a sequence of frames of the video. The first area of interest may be identified using the face recognition techniques described above, and/or by identifying areas in the scene having activity as described above. In some embodiments, the first area of interest comprises an area that will not be obstructed from view, or blocked out, by the insertion of additional content, such as one or more advertisements.

In some embodiments, after a first area of interest has been identified, an insertion area is then identified in the image or scene where additional content can be inserted without obstructing the first area of interest. By inserting additional content, such as an advertisement, into the insertion area, the view of the first area of interest is not obstructed or blocked by the additional content. Thus, in some embodiments, an image or a scene in the video is broken down into a first area of interest and an insertion area. The insertion area is open for receiving inserted additional content, such as one or more advertisements. In this way, the additional content will not be inserted into areas having faces that meet a certain threshold and/or that have activity. Thus, in some embodiments, face recognition or detection may be used to identify spaces where advertisements will not be inserted, which possibly opens up the rest of the image or scene for one or more advertisements.

In some embodiments, the insertion area is further analyzed to determine whether it can be divided into two or more regions based on color. For example, the open spots in the image or scene may be subdivided based on color to create regions. In some embodiments, the additional content, such as an advertisement, is placed so that it is completely within one region and does not straddle across the different regions. It is believed that such straddling across different regions will make the additional content look sloppy. It is further believed that the additional content, such as an advertisement, will look more natural if it is placed neatly within one color region. Thus, in some embodiments, regions are defined based on color, and the additional content, such as an advertisement, may be selected so that it matches the color of the region to make it more aesthetically pleasing.

The above described methods may be applied to still photographs, pictures, and images, as well as to moving picture type content, such as a sequence of frames of content, such as in video type content, movies, television, videos, etc. Furthermore, in some embodiments the above described methods operate in real time. That is, for example in some embodiments, an item of video content may be played for a viewer, and while the content is playing and the viewer is watching, one or more of the above described steps of identifying a first area of interest, identifying an insertion area, dividing the insertion are into regions, and inserting additional content, may be performed in real time while the viewer is watching the content play. Thus, for example in some embodiments, the above described technique of using face recognition to determine a first area of interest, determining an insertion area, dividing the insertion are into regions, and then inserting additional content, may be performed in real time while the viewer is watching the content play.

In contrast, in some embodiments one or more of the above described methods operate in non-real time. That is, for example in some embodiments, one or more of the above described steps of identifying a first area of interest, identifying an insertion area, dividing the insertion are into regions, and inserting additional content, may be performed on an item of content before the content is played for a viewer. Or, as another alternative, in some embodiments one or some of the above described steps may be performed in non-real time, and one or some of the steps may be performed in real time. That is, for example in some embodiments, the steps of identifying a first area of interest, identifying an insertion area, and dividing the insertion area into regions may be performed on an item of content before the content is played for a viewer, and then the step of inserting additional content, such as an advertisement, may be performed on the content in real time while the viewer is watching the content play. It should be understood that any combination of steps may be performed in non-real time and in real time.

In some embodiments, a user may play and view the content using any type of processor based apparatus, such as for example any one or more of a set-top box, cable box, entertainment system, game console, computer, television, etc. Any such devices may be connected to an external display or have an integrated or built-in display. In some embodiments, such a processor based apparatus may receive and play an item of content that has been, or will be, processed and/or modified by one or more steps of the above-described methods and techniques. For example, in some embodiments, such a processor based apparatus may receive and play an item of content that was previously processed and/or modified by one or more steps of the above-described methods and techniques. This comprises an example where at least one or more of the above steps are performed in non-real time since the item of content was previously processed and/or modified by one or more steps of the above-described methods and techniques. The previous processing and/or modifying may be performed by a different processor based apparatus, which may comprise any type of computer, server, workstation, mainframe computer, central computer, etc., or may comprise any one or more of a set-top box, cable box, entertainment system, game console, computer, television, etc. Or, the previous processing and/or modifying may be performed by the same processor based apparatus.

As another example, in some embodiments, such a processor based apparatus may receive, process, and play an item of content. That is, the processor based apparatus processes and/or modifies the item of content in real time according to one or more steps of the above-described methods and techniques. In such a scenario, in some embodiments, the processing may occur in a viewer's home, office, or other location using any one or more of a set-top box, cable box, entertainment system, game console, computer, television, etc.

In some embodiments, a first portion or item of content that has been, or will be, processed or modified using the above described techniques, may be paired with a second portion or item of content when played for one or more viewers. For example, a first portion or item of content, in which additional content, such as an advertisement, has been inserted using the above described techniques, may be paired with a second, or primary, portion or item of content, and then the two portions of content are played sequentially for one or more viewers.

FIG. 9 illustrates an example of such pairing in accordance with an embodiment of the present invention. Specifically, a time axis 902 is illustrated. A first portion or item of content 904 is followed by a second portion or item of content 906. The first portion or item of content 904 may comprise a first sequence of frames of content, and the second portion or item of content 906 may comprise a second sequence of frames of content. In some embodiments, the first portion or item of content 904 and the second portion or item of content 906 may be part of the same item of content, or they may be considered two separate items of content. By way of example, the first portion or item of content 904 and the second portion or item of content 906 may comprise one or more videos, movies, television programs, etc. In some embodiments, the second portion or item of content 906 comprises an item of main primary content, whereas the first portion or item of content 904 comprises a generally shorter video.

As illustrated, the first portion or item of content 904 has been modified using the above described techniques to insert additional content 908 therein. For example, in some embodiments a first area of interest may have been identified in the first portion or item of content 904, and then an insertion area identified, and then the additional content 908 inserted therein. In some embodiments, the additional content 908 may comprise one or more advertisements. When the portions of content 904 and 906 are played sequentially, the first sequence of frames 904 plays and displays the inserted additional content 908, and then the second sequence of frames 906 plays. When played, the portions of content 904 and 906 and the inserted additional content 908 are displayed on a user's display screen. An example scenario of such an embodiment is a model where a video having an advertisement inserted therein using the above described technology is played before primary content, such as a movie, TV show, documentary, music video, news program, etc.

Thus, in order for the user to view the second portion or item of content 906 he or she must first view the first portion or item of content 904, which includes viewing the inserted additional content 908, which may comprise an advertisement. That is, the user does not get access to the second portion or item of content 906 until he or she first views the first portion or item of content 904. In this way, an advertisement in the form of the additional content 908 may be played before the user gets access to the second portion or item of content 906, which in some embodiments may comprise an item of main primary content.

In some embodiments, the user is provided an option during the playing of the first sequence of frames 904 to skip the inserted additional content 908. In some embodiments, the skip option skips only the inserted additional content 908 and then continues playing the remainder of the first sequence of frames 904 before playing the second sequence of frames 906. In some embodiments, the skip option skips the inserted additional content 908 as well as the remainder of the first sequence of frames 904, and then begins playing again at the beginning of the second sequence of frames 906. That is, the skip option skips forward to the second sequence of frames 906. In either embodiment, the skip option skips at least the inserted additional content 908. Thus, skipping the inserted additional content 908 shall mean skipping only the inserted additional content 908 and then continuing playing the remainder of the first sequence of frames 904, and/or it shall mean skipping forward to the second sequence of frames 906.

In some embodiments, the option to skip the inserted additional content 908 is provided to the user after an elapsed amount of time. Thus, the user is required to watch the inserted additional content 908 for at least the elapsed amount of time. An example scenario of such an embodiment is a model where a video having an advertisement inserted therein using the above described technology is played before primary content, and where the user is provided an option to skip the advertisement after an elapsed amount of time. The elapsed amount of time may comprise any amount of time.

In some embodiments, the option to skip the inserted additional content 908 is provided to the user in response to the user clicking on something on the user's screen. For example, in some embodiments the user may be required to click on the inserted additional content 908 when it is displayed in order to trigger the option to skip it. Or, in some embodiments, the user may be required to click on something else in order to trigger the option to skip the inserted additional content 908. An example scenario of such an embodiment is a model where a video having an advertisement inserted therein using the above described technology is played before primary content, and where the user is provided an option to skip the advertisement after clicking on something, such as the advertisement as it is displayed on the user's screen. That is, the user clicks somewhere to go directly into the primary content. The user does not have to click on the advertisement, the user just has to click somewhere.

In some embodiments, the first portion or item of content 904 may be played while the second portion or item of content 906 is being buffered. Furthermore, in some embodiments the option to skip the inserted additional content 908 is not provided to the user until the buffer for the second portion or item of content 906 is at a suitable level. Thus, if the user has slow bandwidth, he or she might not be able to skip the additional content 908. That is, the entire first portion or item of content 904 including the additional content 908 might play before the buffer is at a suitable level with the second portion or item of content 906. In contrast, if the user has fast bandwidth, then he or she will probably be able to skip the additional content 908 quicker.

Thus, in some embodiments, the option to skip the inserted additional content 908 is delayed and is not provided to the user right away. For example, in some embodiments, the option to skip the inserted additional content 908 is provided to the user based on the buffer state or the buffering progress of the second portion or item of content 906, which may comprise the primary content. In some embodiments, the option to skip the inserted additional content 908 is provided to the user based on business conditions or commercial conditions. For example, if the inserted additional content 908 comprises an advertisement, and the business conditions suggest that viewing of the advertisement should be increased, then the delay in providing the option to skip the inserted additional content 908 could be increased in order to force the viewer to watch more of the advertisement.

In some embodiments, the ability to adjust the amount of delay in providing users with the option to skip the inserted additional content 908 may help advertisers measure how much advertising consumers will tolerate.

In some embodiments, the additional content 908 is instead inserted into the second portion or item of content 906 and not the first portion or item of content 904, with the second portion or item of content 906 comprising the main primary content. In some embodiments, the first portion or item of content 904 may itself comprise a traditional advertisement and still include an option to skip the portion 904. If the user exercises such option to skip, then the second portion or item of content 906 would play, which would include playing the inserted additional content 908, which may comprise an advertisement.

As mentioned above, in some embodiments one or more of the above described steps of identifying a first area of interest, identifying an insertion area, and inserting additional content may be performed in real time while a user is watching the content play. In some embodiments this also includes providing the option to skip in real time while a user is watching the content play.

In some embodiments, one or more of such steps may be performed in non-real time. For example, one or more of the above described steps of identifying a first area of interest, identifying an insertion area, and inserting additional content may be performed before the content is played for a user. For example, a first sequence of frames may be played, wherein the first sequence of frames includes an advertisement inserted into a scene depicted by at least some of the frames in the first sequence of frames. Then, a second sequence of frames may be played after the first sequence of frames, and a skip option may also be provided. In some embodiments, prior to the playing of the first and second sequence of frames, the advertisement is inserted into the scene in the first sequence of frames by a process that may include identifying one or more faces in the scene using a face recognition technique, designating at least one of the identified faces collectively as a first area of interest, and inserting the advertisement into an insertion area in the scene that does not obstruct the first area of interest.

The methods and techniques described herein may be utilized, implemented and/or run on many different types of systems, computers, graphics workstations, televisions, set-top boxes, cable boxes, entertainment systems, game consoles, video game systems, DVD players, DVRs, media players, home servers, video game consoles, and the like, and any other type of processor based systems or apparatuses. Referring to FIG. 10, there is illustrated a system 1000 that may be used for any such implementations. One or more components of the system 1000 may be used for implementing any system mentioned above. However, the use of the system 1000 or any portion thereof is certainly not required.

By way of example, the system 1000 may include, but is not required to include, a central processing unit (CPU) 1002, a graphics processing unit (GPU) 1004, digital differential analysis (DDA) hardware 1006, a random access memory (RAM) 1008, and a mass storage unit 1010, such as a disk drive. The system 1000 may be coupled to, or integrated with, a display 1012, such as for example any type of display, including any of the types of displays mentioned herein. The system 1000 comprises an example of a processor based system and/or a processor based apparatus. Not all of the illustrated components of the system 1000 are required for such a processor based system and/or a processor based apparatus.

The CPU 1002 and/or GPU 1004 may be used to execute or assist in executing the steps of the methods and techniques described herein, and various program content, images, videos, etc. may be rendered on the display 1012. Removable storage media 1014 may optionally be used with the mass storage unit 1010, which may be used for storing code that implements the methods and techniques described herein. However, any of the storage devices, such as the RAM 1008 or mass storage unit 1010, may be used for storing such code. Furthermore, any of the storage devices, such as the RAM 1008 or mass storage unit 1010, may be used for storing the database described above. Either all or a portion of the system 1000 may be embodied in any type of device, such as for example a computer, workstation, television, video game console or system, or any other type of device, including any type of device mentioned herein.

An input device (not shown) may also be included and may comprise any type of input device or input technique or method. For example, the input device may comprise a game controller, game pad, joystick, mouse, wand, or other input devices and/or input techniques. The input device may be wireless or wired, e.g. it may be wirelessly coupled to the system 1000 or comprise a wired connection.

The mass storage unit 1010 may include or comprise any type of computer readable storage or recording medium or media. The computer readable storage or recording medium or media may be fixed in the mass storage unit 1010, or the mass storage unit 1010 may optionally include removable storage media 1014, such as a digital video disk (DVD), Blu-ray disc, compact disk (CD), USB storage device, floppy disk, or other media. By way of example, the mass storage unit 1010 may comprise a disk drive, a hard disk drive, flash memory device, USB storage device, Blu-ray disc drive, DVD drive, CD drive, floppy disk drive, etc. The mass storage unit 1010 or removable storage media 1014 may be used for storing code or macros that implement the methods and techniques described herein.

Thus, removable storage media 1014 may optionally be used with the mass storage unit 1010, which may be used for storing program or computer code that implements the methods and techniques described herein, such as program code for running the above-described methods and techniques. However, any of the storage devices, such as the RAM 1008 or mass storage unit 1010, may be used for storing such code. For example, any of such storage devices may serve as a tangible non-transitory computer readable storage medium for storing or embodying a computer program or software application for causing a console, system, computer, client, server, or other processor based apparatus or system to execute or perform the steps of any of the methods, code, and/or techniques described herein. Furthermore, any of the storage devices, such as the RAM 1008 or mass storage unit 1010, may be used for storing any needed database(s).

In some embodiments, one or more of the embodiments, methods, approaches, and/or techniques described above may be implemented in one or more computer programs or software applications executable by a processor based apparatus or system. By way of example, such processor based system may comprise the processor based apparatus or system 1000, or a computer, entertainment system, game console, graphics workstation, server, client, portable device, pad-like device, etc. Such computer program(s) may be used for executing various steps and/or features of the above-described methods and/or techniques. That is, the computer program(s) may be adapted to cause or configure a processor based apparatus or system to execute and achieve the functions described above. For example, such computer program(s) may be used for implementing any embodiment of the above-described methods, steps, techniques, or features. As another example, such computer program(s) may be used for implementing any type of tool or similar utility that uses any one or more of the above described embodiments, methods, approaches, and/or techniques. In some embodiments, one or more such computer programs may comprise a computer game, video game, role-playing game (RPG), other computer simulation, or system software such as an operating system, BIOS, macro, or other utility. In some embodiments, program code macros, modules, loops, subroutines, calls, etc., within or without the computer program(s) may be used for executing various steps and/or features of the above-described methods and/or techniques. In some embodiments, the computer program(s) may be stored or embodied on a computer readable storage or recording medium or media, such as any of the computer readable storage or recording medium or media described herein.

Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, and/or techniques described herein. For example, in some embodiments the present invention provides one or more non-transitory computer readable storage mediums storing one or more computer programs adapted to cause a processor based apparatus or system to execute steps comprising: analyzing an image; identifying one or more faces in the image using a face recognition technique; designating at least one of the identified faces collectively as a first area of interest; and determining whether an insertion area exists in the image where additional content can be inserted without obstructing the first area of interest.

In some embodiments the present invention provides one or more non-transitory computer readable storage mediums storing one or more computer programs adapted to cause a processor based system to execute steps comprising: analyzing a sequence of frames of content; identifying a first area of interest in a scene depicted by the sequence of frames that should not be obstructed from being viewed; determining whether an insertion area exists in the scene where additional content can be inserted without obstructing the first area of interest; and determining whether the insertion area can be divided into two or more regions based on color.

In some embodiments the present invention provides one or more non-transitory computer readable storage mediums storing one or more computer programs adapted to cause a processor based system to execute steps comprising: analyzing a first sequence of frames of content; identifying one or more faces in a scene depicted by the first sequence of frames using a face recognition technique; designating at least one of the identified faces collectively as a first area of interest; and determining whether an insertion area exists in the scene where additional content can be inserted without obstructing the first area of interest.

In some embodiments the present invention provides one or more non-transitory computer readable storage mediums storing one or more computer programs adapted to cause a processor based system to execute steps comprising: playing a first sequence of frames, wherein the first sequence of frames includes an advertisement inserted into a scene depicted by at least some of the frames in the first sequence of frames; and playing a second sequence of frames after the first sequence of frames; wherein the advertisement was inserted into the scene in the first sequence of frames by a process that includes, identifying one or more faces in the scene using a face recognition technique; designating at least one of the identified faces collectively as a first area of interest; and inserting the advertisement into an insertion area in the scene that does not obstruct the first area of interest.

In some embodiments the present invention provides a processor based system or a processor based apparatus that is configured to execute steps comprising any one or more steps of the above-described methods, approaches, and/or techniques. For example, in some embodiments the present invention provides a processor based apparatus that is configured to execute steps comprising: analyzing an image; identifying one or more faces in the image using a face recognition technique; designating at least one of the identified faces collectively as a first area of interest; and determining whether an insertion area exists in the image where additional content can be inserted without obstructing the first area of interest.

In some embodiments the present invention provides a processor based apparatus that is configured to execute steps comprising: analyzing a sequence of frames of content; identifying a first area of interest in a scene depicted by the sequence of frames that should not be obstructed from being viewed; determining whether an insertion area exists in the scene where additional content can be inserted without obstructing the first area of interest; and determining whether the insertion area can be divided into two or more regions based on color.

In some embodiments the present invention provides a processor based apparatus that is configured to execute steps comprising: analyzing a first sequence of frames of content; identifying one or more faces in a scene depicted by the first sequence of frames using a face recognition technique; designating at least one of the identified faces collectively as a first area of interest; and determining whether an insertion area exists in the scene where additional content can be inserted without obstructing the first area of interest.

While the invention herein disclosed has been described by means of specific embodiments and applications thereof, numerous modifications and variations could be made thereto by those skilled in the art without departing from the scope of the invention set forth in the claims.

What is claimed is:

1. A non-transitory computer readable storage medium storing one or more computer programs adapted to cause a processor based system to execute steps comprising:
   analyzing a sequence of frames of content;
   identifying a first area of interest in a scene depicted by the sequence of frames that should not be obstructed from being viewed;
   determining whether an insertion area exists in the scene where additional content can be inserted without obstructing the first area of interest;
   determining whether the insertion area includes two or more regions within the insertion area that each have a different color;
   dividing the insertion area into the two or more regions that each have a different color; and
   inserting the additional content into one of the two or more regions such that the additional content is completely contained within the one of the two or more regions.

2. The non-transitory computer readable storage medium of claim 1, wherein the one or more computer programs are further adapted to cause the processor based system to execute steps comprising:
   selecting the additional content at least partly based on a color of the one of the two or more regions.

3. The non-transitory computer readable storage medium of claim 1, wherein the inserting the additional content into one of the two or more regions such that the additional content is completely contained within the one of the two or more regions comprises:
   maintaining a buffer area between the additional content and an edge of the one of the two or more regions.

4. The non-transitory computer readable storage medium of claim 1, wherein the inserting the additional content into one of the two or more regions such that the additional content is completely contained within the one of the two or more regions comprises:
   placing the additional content so that it is fixed in the one of the two or more regions in the scene and is not allowed to move in the scene.

5. The non-transitory computer readable storage medium of claim 1, wherein the inserting the additional content into one of the two or more regions such that the additional content is completely contained within the one of the two or more regions comprises:
   placing the additional content so that it is allowed to move within the one of the two or more regions in the scene.

6. The non-transitory computer readable storage medium of claim 1, wherein the identifying a first area of interest in a scene depicted by the sequence of frames that should not be obstructed from being viewed comprises:
   identifying one or more faces in the scene using a face recognition technique.

7. The non-transitory computer readable storage medium of claim 1, wherein the identifying a first area of interest in a scene depicted by the sequence of frames that should not be obstructed from being viewed comprises:
   identifying areas in the scene having activity.

8. A method, comprising:
   analyzing a sequence of frames of content;
   identifying a first area of interest in a scene depicted by the sequence of frames that should not be obstructed from being viewed;

determining whether an insertion area exists in the scene where additional content can be inserted without obstructing the first area of interest;

determining whether the insertion area includes two or more regions within the insertion area that each have a different color;

dividing the insertion area into the two or more regions that each have a different color; and inserting the additional content into one of the two or more regions such that the additional content is completely contained within the one of the two or more regions.

9. A processor based apparatus receiving and playing the content processed by the method of claim 8.

10. The processor based apparatus of claim 9, wherein the processor based apparatus comprises any one or more of a set-top box, cable box, entertainment system, game console, computer, and television.

\* \* \* \* \*